(12) United States Patent
Elliman

(10) Patent No.: US 11,416,518 B2
(45) Date of Patent: Aug. 16, 2022

(54) MACHINE LEARNING FOR MACHINE-ASSISTED DATA CLASSIFICATION

(71) Applicant: Optum, Inc., Minnetonka, MN (US)

(72) Inventor: David S. Elliman, Horsham, PA (US)

(73) Assignee: Optum, Inc., Minnetonka, MN (US)

( * ) Notice: Subject to any disclaimer, the term of this patent is extended or adjusted under 35 U.S.C. 154(b) by 961 days.

(21) Appl. No.: 16/174,950

(22) Filed: Oct. 30, 2018

(65) Prior Publication Data

US 2020/0134083 A1 Apr. 30, 2020

(51) Int. Cl.
*G06F 16/28* (2019.01)
*G06F 3/0482* (2013.01)
*G06F 17/18* (2006.01)
*G06K 9/62* (2022.01)
*G06N 20/00* (2019.01)

(52) U.S. Cl.
CPC .......... *G06F 16/285* (2019.01); *G06F 3/0482* (2013.01); *G06F 17/18* (2013.01); *G06K 9/626* (2013.01); *G06N 20/00* (2019.01)

(58) Field of Classification Search
CPC ...... G06F 16/285; G06F 3/0482; G06F 17/18; G06N 20/00; G06K 9/626
USPC .......................................................... 706/59
See application file for complete search history.

(56) References Cited

U.S. PATENT DOCUMENTS

| 7,406,452 | B2 | 7/2008 | Forman et al. | |
|---|---|---|---|---|
| 7,574,409 | B2* | 8/2009 | Patinkin | G06Q 10/107 706/12 |
| 7,668,789 | B1* | 2/2010 | Forman | G06N 20/00 706/20 |
| 7,769,759 | B1 | 8/2010 | Gartung et al. | |
| 7,792,353 | B2* | 9/2010 | Forman | G06N 20/00 382/159 |
| 8,010,466 | B2 | 8/2011 | Patinkin | |
| 8,311,957 | B2* | 11/2012 | Kirshenbaum | G06N 5/02 706/12 |
| 8,355,997 | B2* | 1/2013 | Kirshenbaum | G06N 5/02 706/12 |
| 8,589,317 | B2 | 11/2013 | Paquet et al. | |
| 2008/0103996 | A1* | 5/2008 | Forman | G06N 20/00 706/12 |
| 2008/0141215 | A1* | 6/2008 | Elliman | G06F 9/451 717/105 |
| 2014/0075004 | A1* | 3/2014 | Van Dusen | G06Q 30/0201 709/223 |

OTHER PUBLICATIONS

"Data Classification Analysis," IBM InfoSphere Information Analyzer, Version 9.1.0, (7 pages), [Retrieved from the Internet Aug. 12, 2019] <https://www.ibm.com/support/knowledgecenter/en/SSZJPZ_9.1.0/com.ibm.swg.im.iis.ia.application.doc/topics/r_dca_function.html>.

(Continued)

*Primary Examiner* — William D Titcomb
(74) *Attorney, Agent, or Firm* — Alston & Bird LLP

(57) ABSTRACT

Methods, apparatus, systems, computing devices, computing entities, and/or the like for employing machine learning concepts to accurately predict categories for unseen data assets, present the same to a user via a user interface for review, and assign the categories to the data assets responsive to user interaction confirming the same.

18 Claims, 20 Drawing Sheets

(56) References Cited

OTHER PUBLICATIONS

Srinivas, M., "Multi-Level Classification: A Generic Classification Method for Medical Datasets," 2015 17th International Conference on E-Health Networking, Application & Services (HealthCom), Boston, MA, (2015), pp. 262-267. DOI: 10.1109/HealthCom.2015.7454509.

Uckunlar Mehmet Orkun, "A Web-Based System for Automatic Bioinformatics Data Classification," Bogazici University, Department of Computer Engineering, Jun. 8, 2014, (7 pages), YouTube Video, [Retrieved from the internet Aug. 13, 2019] <https://www.youtube.com/watch?v=AvLO8JJWM2c>.

* cited by examiner

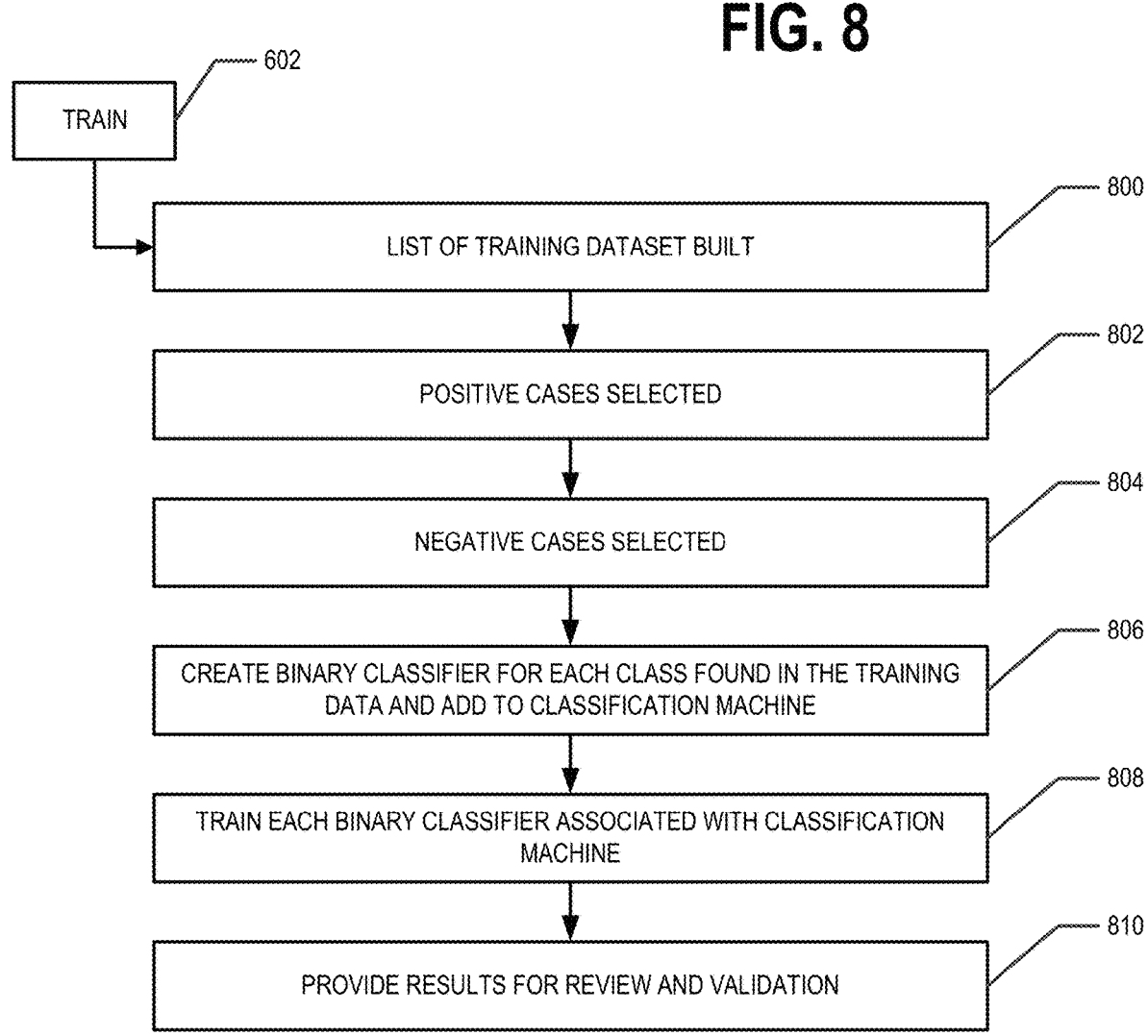

MACHINE LEARNING FOR MACHINE-ASSISTED DATA CLASSIFICATION

TECHNOLOGICAL FIELD

Embodiments of the present invention generally relate to machine-learning based methodologies for machine-assisted data classification.

BACKGROUND

Data classification is essential to effective management and governance of data assets. In the past, this is primarily been a manual process. Manual classification of data assets is a labor intensive and costly, and is more error prone that machine-assisted data classification. This is because manual classification of data assets typically requires a subject matter expert familiar with the data asset to inspect each data element (e.g., such as Hive tables or Hive columns in a source data assets) and assign the data asset to a particular a category/class.

Accordingly, there is a latent need for a rigorous methodology that can accurately predict categories for data assets, present the same via a user interface, and assign the categories to the data assets responsive to user interaction confirming the same. Through applied effort, ingenuity, and innovation, the inventors have developed systems and methods for the same. Some examples of these solutions are described in detail herein.

BRIEF SUMMARY

In general, embodiments of the present invention provide methods, apparatus, systems, computing devices, computing entities, and/or the like.

In accordance with one aspect, a method is provided. In one embodiment, the method comprises storing a first classification machine, wherein (a) the first classification machine is associated with a first data taxonomy comprising a first plurality of data asset classes, (b) for each of the first plurality of data asset classes, the first classification machine comprises a machine learning model, (c) each machine learning model of the first classification machine is configured to generate predicted confidence scores for unseen data assets, and (d) each predicted confidence score indicates the corresponding machine learning model's confidence that the corresponding unseen data asset belongs to the machine learning model's data asset class; executing each machine learning model of the first classification machine on metadata for each of a first plurality of unseen data assets, wherein each machine learning model generates predicted confidence scores for each unseen data asset of the first plurality of unseen data assets; and generating a presentation for display via an interface, the presentation comprising at least a portion of the first plurality of unseen data assets, wherein, for each of the at least a portion of the first plurality of unseen data assets, the presentation (a) comprises a confidence score and the machine learning model's data asset class, and (b) a user-selectable option to accept or override the corresponding machine learning model's data asset class.

In accordance with another aspect, a computer program product is provided. The computer program product may comprise at least one computer-readable storage medium having computer-readable program code portions stored therein, the computer-readable program code portions comprising executable portions configured to store a first classification machine, wherein (a) the first classification machine is associated with a first data taxonomy comprising a first plurality of data asset classes, (b) for each of the first plurality of data asset classes, the first classification machine comprises a machine learning model, (c) each machine learning model of the first classification machine is configured to generate predicted confidence scores for unseen data assets, and (d) each predicted confidence score indicates the corresponding machine learning model's confidence that the corresponding unseen data asset belongs to the machine learning model's data asset class; execute each machine learning model of the first classification machine on metadata for each of a first plurality of unseen data assets, wherein each machine learning model generates predicted confidence scores for each unseen data asset of the first plurality of unseen data assets; and generate a presentation for display via an interface, the presentation comprising at least a portion of the first plurality of unseen data assets, wherein, for each of the at least a portion of the first plurality of unseen data assets, the presentation (a) comprises a confidence score and the machine learning model's data asset class, and (b) a user-selectable option to accept or override the corresponding machine learning model's data asset class.

In accordance with yet another aspect, a computing system comprising at least one processor and at least one memory including computer program code is provided. In one embodiment, the at least one memory and the computer program code may be configured to, with the processor, cause the apparatus to store a first classification machine, wherein (a) the first classification machine is associated with a first data taxonomy comprising a first plurality of data asset classes, (b) for each of the first plurality of data asset classes, the first classification machine comprises a machine learning model, (c) each machine learning model of the first classification machine is configured to generate predicted confidence scores for unseen data assets, and (d) each predicted confidence score indicates the corresponding machine learning model's confidence that the corresponding unseen data asset belongs to the machine learning model's data asset class; execute each machine learning model of the first classification machine on metadata for each of a first plurality of unseen data assets, wherein each machine learning model generates predicted confidence scores for each unseen data asset of the first plurality of unseen data assets; and generate a presentation for display via an interface, the presentation comprising at least a portion of the first plurality of unseen data assets, wherein, for each of the at least a portion of the first plurality of unseen data assets, the presentation (a) comprises a confidence score and the machine learning model's data asset class, and (b) a user-selectable option to accept or override the corresponding machine learning model's data asset class.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 1:
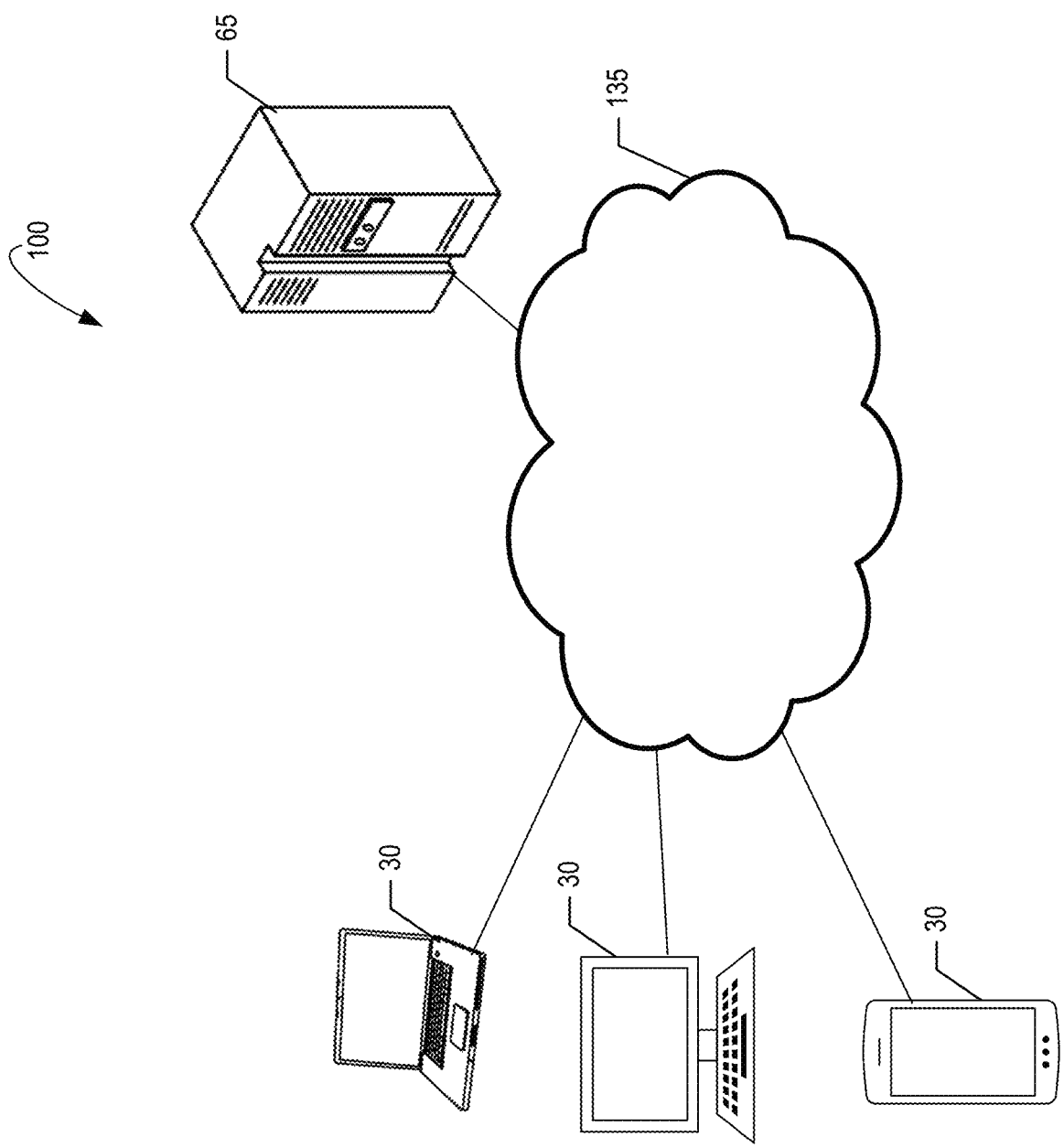
FIG. 1 is a diagram of a data classification system that can be used in conjunction with various embodiments of the present invention.

FIGS. 6, 7A, 7B, 7C, 8, 9A, 9B, and 10 are flowcharts for exemplary connections, operations, steps, and processes in accordance with certain embodiments of the present invention; and FIG. 11-16 provides an exemplary presentation layer that can be dynamically updated based at least in part on one or more machine learning models in accordance with embodiments of the present invention.

DETAILED DESCRIPTION OF SOME EXAMPLE EMBODIMENTS

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers refer to like elements throughout.

I. Computer Program Products, Methods, and Computing Entities

Embodiments of the present invention may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAIVI), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAIVI), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of a data structure, apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. Exemplary System Architecture

FIG. 1 provides an illustration of a data classification system 100 that can be used in conjunction with various embodiments of the present invention. As shown in FIG. 1, the data classification system 100 may comprise one or more classification computing entities 65, one or more user computing entities 30, one or more networks 135, and/or the like. Each of the components of the system may be in electronic communication with, for example, one another over the same or different wireless or wired networks 135 including, for example, a wired or wireless Personal Area Network (PAN), Local Area Network (LAN), Metropolitan Area Network (MAN), Wide Area Network (WAN), and/or the like. Additionally, while FIG. 1 illustrate certain system entities as separate, standalone entities, the various embodiments are not limited to this particular architecture.

a. Exemplary Classification Computing Entity

Figure 2A:
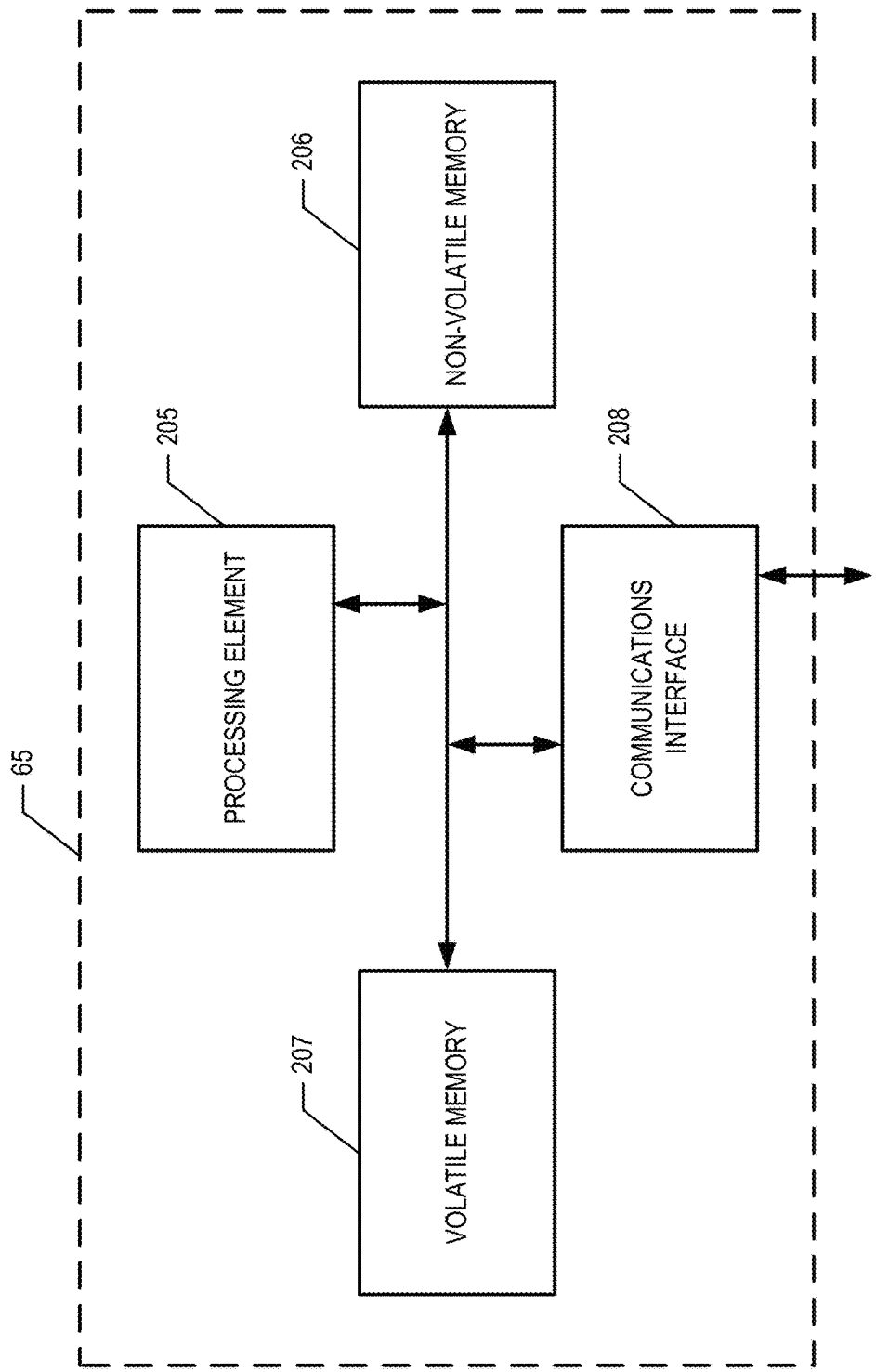
FIG. 2A is a schematic of a classification computing entity in accordance with certain embodiments of the present invention.

FIG. 2A provides a schematic of a classification computing entity 65 according to one embodiment of the present invention. In general, the terms computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the classification computing entity 65 may also include one or more network and/or communications interfaces 208 for communicating with various computing entities, such as by communicating data, content, information, and/or similar terms used herein interchangeably that can be transmitted, received, operated on, processed, displayed, stored, and/or the like. For instance, the classification computing entity 65 may communicate with other computing entities, one or more user computing entities 30, and/or the like.

As shown in FIG. 2A, in one embodiment, the classification computing entity 65 may include or be in communication with one or more processing elements 205 (also referred to as processors, processing circuitry, and/or similar terms used herein interchangeably) that communicate with other elements within the classification computing entity 65 via a bus, for example, or network connection. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the classification computing entity 65 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 206 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, metadata repositories database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to refer to a structured or unstructured collection of information/data that is stored in a computer-readable storage medium.

Memory media 206 (e.g., metadata repository) may also be embodied as a data storage device or devices, as a separate database server or servers, or as a combination of data storage devices and separate database servers. Further, in some embodiments, memory media 206 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. An example of the embodiments contemplated herein would include a cloud data storage system maintained by a third party provider and where some or all of the information/data required for the operation of the data classification system may be stored. As a person of ordinary skill in the art would recognize, the information/data required for the operation of the data classification system may also be partially stored in the cloud data storage system and partially stored in a locally maintained data storage system.

Figure 2B:
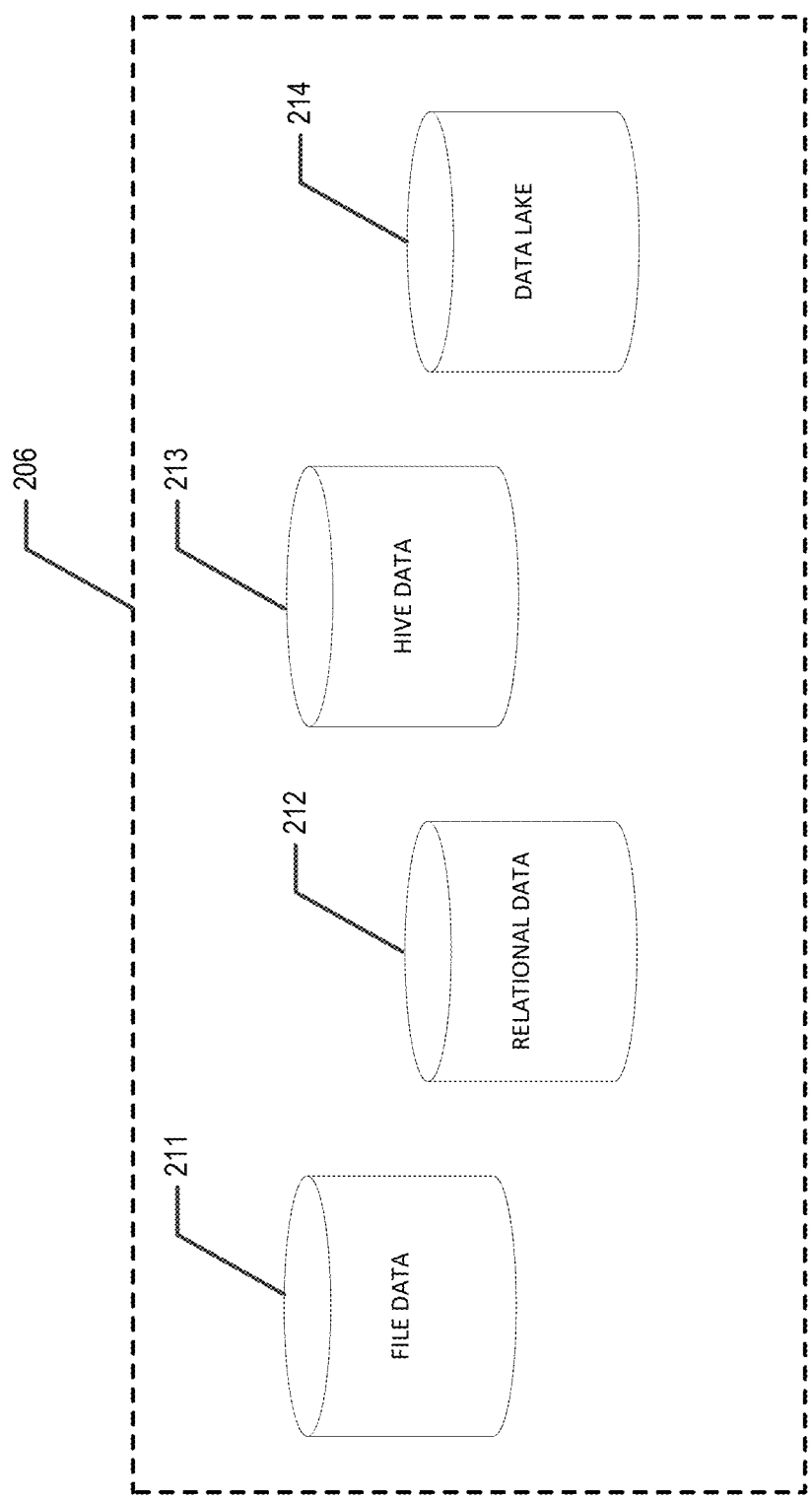
FIG. 2B is a schematic representation of a memory media storing a plurality of data assets.

Memory media 206 (e.g., metadata repository) may include information/data accessed and stored by the data classification system to facilitate the operations of the system. More specifically, memory media 206 may encompass one or more data stores configured to store information/data usable in certain embodiments. For example, as shown in FIG. 2B, metadata for data assets may be stored in metadata repositories encompassed within the memory media 206. The metadata for the data assets in the metadata data stores, metadata repositories, and similar words used herein interchangeably may comprise file information/data 211, relational information/data 212, Hive information/data 213, data lake information information/data, and/or various other types of information/data. As will be recognized, metadata repositories are inventories data assets in an organization's environment.

In one embodiment, the classification computing entity 65 may further include or be in communication with volatile media (also referred to as volatile storage, memory, memory storage, memory circuitry and/or similar terms used herein interchangeably). In one embodiment, the volatile storage or memory may also include one or more volatile storage or memory media 207 as described above, such as RAM, DRAM, SRAM, FPM DRAM, EDO DRAM, SDRAM, DDR SDRAM, DDR2 SDRAM, DDR3 SDRAM, RDRAM, VRAM, cache memory, register memory, and/or the like. As will be recognized, the volatile storage or memory media may be used to store at least portions of the databases, database instances, database management system entities, data, applications, programs, program modules, scripts, source code, object code, byte code, compiled code, interpreted code, machine code, executable instructions, and/or the like being executed by, for example, the processing element 308. Thus, the databases, database instances, database management system entities, data, applications, programs, program modules, scripts, source code, object code, byte code, compiled code, interpreted code, machine code, executable instructions, and/or the like may be used to control certain aspects of the operation of the classification computing entity 65 with the assistance of the processing element 205 and operating system.

As indicated, in one embodiment, the classification computing entity 65 may also include one or more network and/or communications interfaces 208 for communicating with various computing entities, such as by communicating data, content, information, and/or similar terms used herein interchangeably that can be transmitted, received, operated on, processed, displayed, stored, and/or the like. For instance, the classification computing entity 65 may communicate with computing entities or communication interfaces of other computing entities 65, user computing entities 30, and/or the like. In this regard, the classification computing entity 65 may access various data assets and store or be associated with one or more classification machines 67A-67B. Thus, the classification computing entity 65 may executed one or more binary classifiers (e.g., associated with classification machines 67A-67B) to predict classifications for data assets. The classification computing entity 65 may also assign the predicted classifications to the data assets based on user interaction as a result of the prediction.

As indicated, in one embodiment, the classification computing entity 65 may also include one or more network and/or communications interfaces 208 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the classification computing entity 65 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The classification computing entity 65 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

As will be appreciated, one or more of the classification computing entity's components may be located remotely from other classification computing entity 65 components, such as in a distributed system. Furthermore, one or more of the components may be aggregated and additional components performing functions described herein may be included in the classification computing entity 65. Thus, the classification computing entity 65 can be adapted to accommodate a variety of needs and circumstances.

b. Exemplary User Computing Entity

Figure 3:
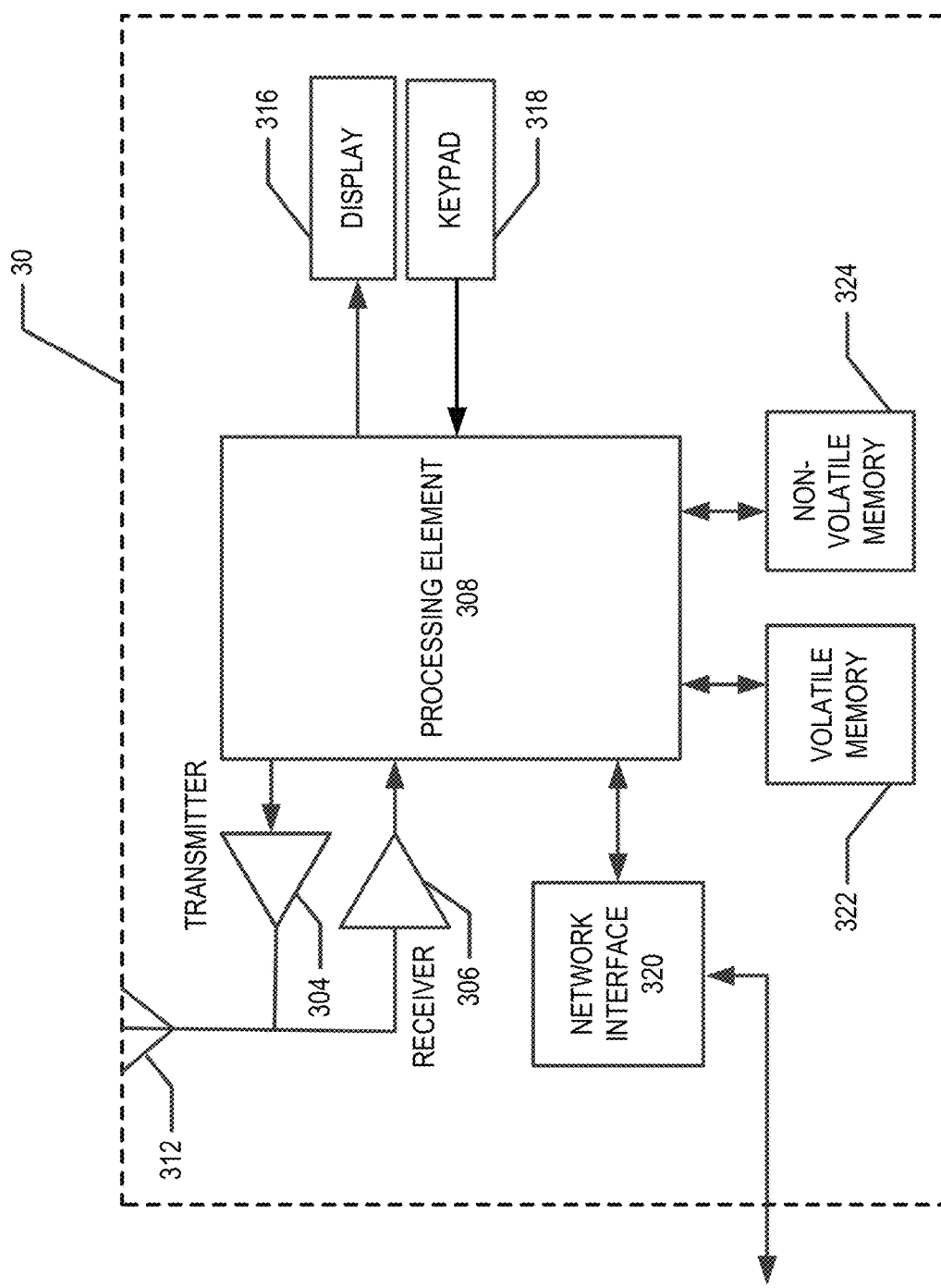
FIG. 3 is a schematic of a user computing entity in accordance with certain embodiments of the present invention.

FIG. 3 provides an illustrative schematic representative of user computing entity 30 that can be used in conjunction with embodiments of the present invention. As will be recognized, the user computing entity may be operated by an agent and include components and features similar to those described in conjunction with the classification computing entity 65. Further, as shown in FIG. 3, the user computing entity may include additional components and features. For example, the user computing entity 30 can include an antenna 312, a transmitter 304 (e.g., radio), a receiver 306 (e.g., radio), and a processing element 308 that provides signals to and receives signals from the transmitter 304 and receiver 306, respectively. The signals provided to and received from the transmitter 304 and the receiver 306, respectively, may include signaling information/data in accordance with an air interface standard of applicable wireless systems to communicate with various entities, such as a classification computing entity 65, another user computing entity 30, and/or the like. In this regard, the user computing entity 30 may be capable of operating with one or more air interface standards, communication protocols, modulation types, and access types. More particularly, the user computing entity 30 may operate in accordance with any of a number of wireless communication standards and protocols. In a particular embodiment, the user computing entity 30 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the user computing entity 30 can communicate with various other entities using concepts such as Unstructured Supplementary Service data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 30 can also download changes, add-ons, and updates, for instance, to its firmware, software (e.g., including executable instructions, applications, program modules), and operating system.

According to one embodiment, the user computing entity 30 may include location determining aspects, devices, modules, functionalities, and/or similar words used herein interchangeably. For example, the user computing entity 30 may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data/data may be determined by triangulating the position in connection with a variety of other systems, including cellular towers, Wi-Fi access points, and/or the like. Similarly, the user computing entity 30 may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing devices (e.g., smartphones, laptops) and/or the like. For instance, such technologies may include iBeacons, Gimbal proximity beacons, BLE transmitters, Near Field Communication (NFC) transmitters, and/or the like. These indoor positioning aspects can be used in a variety of settings to determine the location of someone or something to within inches or centimeters.

The user computing entity 30 may also comprise a user interface 1100 comprising one or more user input/output interfaces (e.g., a display 316 and/or speaker/speaker driver coupled to a processing element 308 and a touch screen, keyboard, mouse, and/or microphone coupled to a processing element 308). For example, the user output interface may be configured to provide an application, browser, user interface, dashboard, webpage, and/or similar words used herein interchangeably executing on and/or accessible via the user computing entity 30 to cause display or audible presentation of information/data and for user interaction therewith via one or more user input interfaces. The user output interface may be updated dynamically from communication with the classification computing entity 65. The user input interface can comprise any of a number of devices allowing the user computing entity 30 to receive data, such as a keypad 318 (hard or soft), a touch display, voice/speech or motion interfaces, scanners, readers, or other input device. In embodiments including a keypad 318, the keypad 318 can include (or cause display of) the conventional numeric (0-9) and related keys (#, *), and other keys used for operating the user computing entity 30 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the user computing entity 30 can collect information/data, user interaction/input, and/or the like.

The user computing entity 30 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the user computing entity 30.

c. Exemplary Networks

In one embodiment, the networks 135 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 135 may have any suitable communication range associated therewith and may include, for example, global networks (e.g., the Internet), MANs, WANs, LANs, or PANs. In addition, the networks 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

III. Exemplary System Operation

Figure 4:
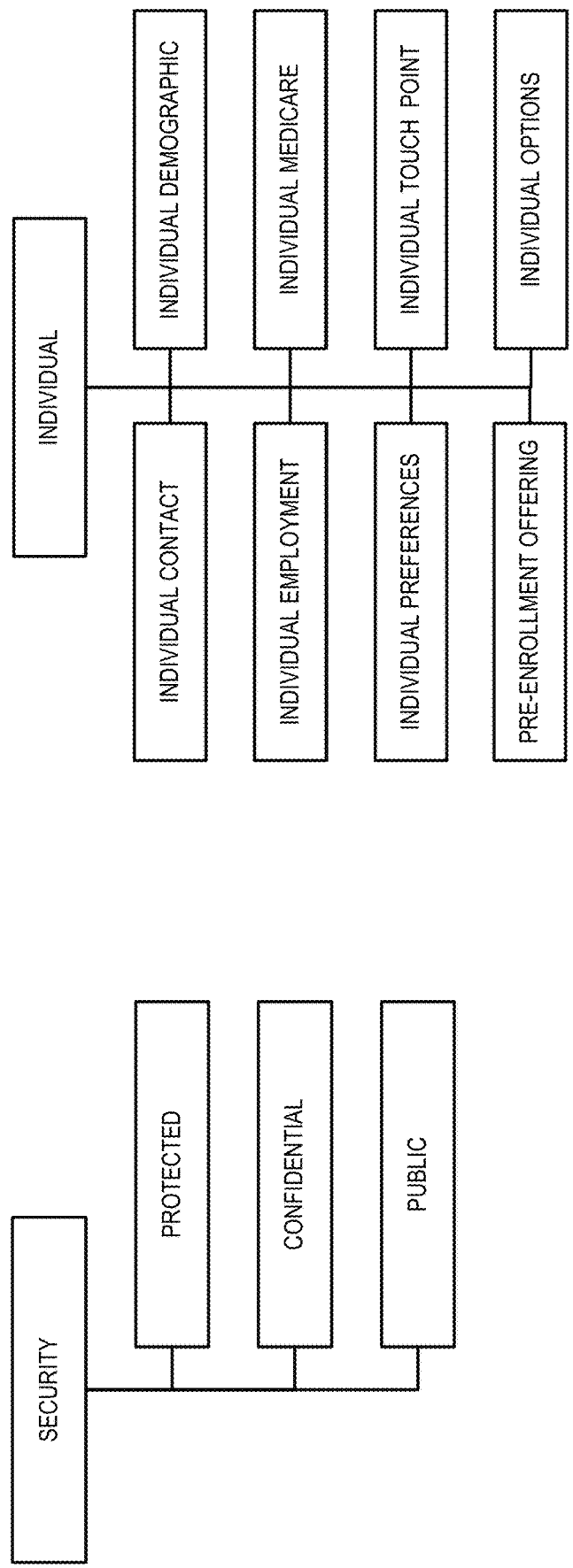
FIGS. 4A and 4B are examples of taxonomies with root classes in accordance with certain embodiments of the present invention.
Figure 5:
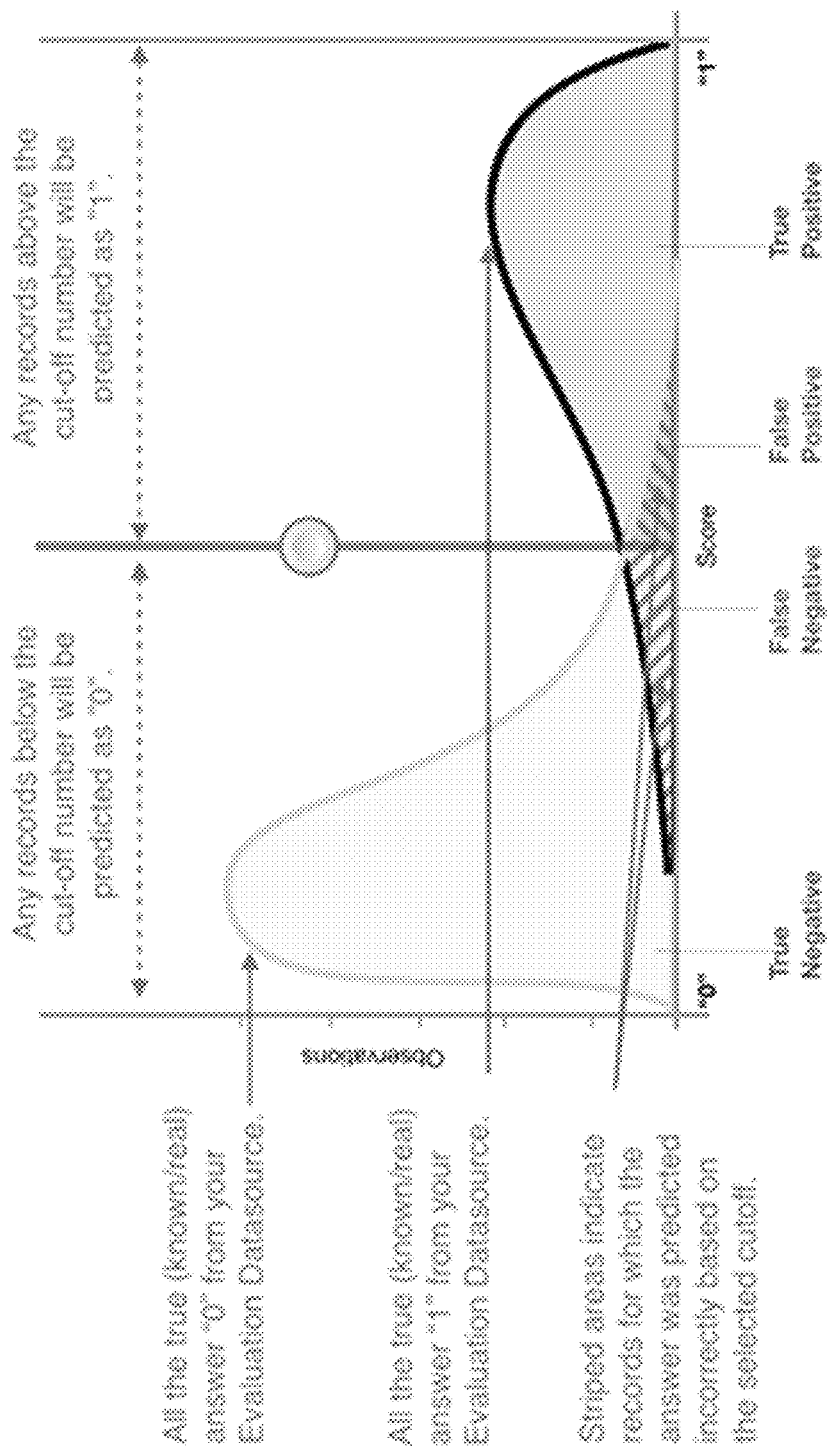
FIG. 5 is an exemplary score distribution for a binary classification model in accordance with certain embodiments of the present invention.
Figure 6:
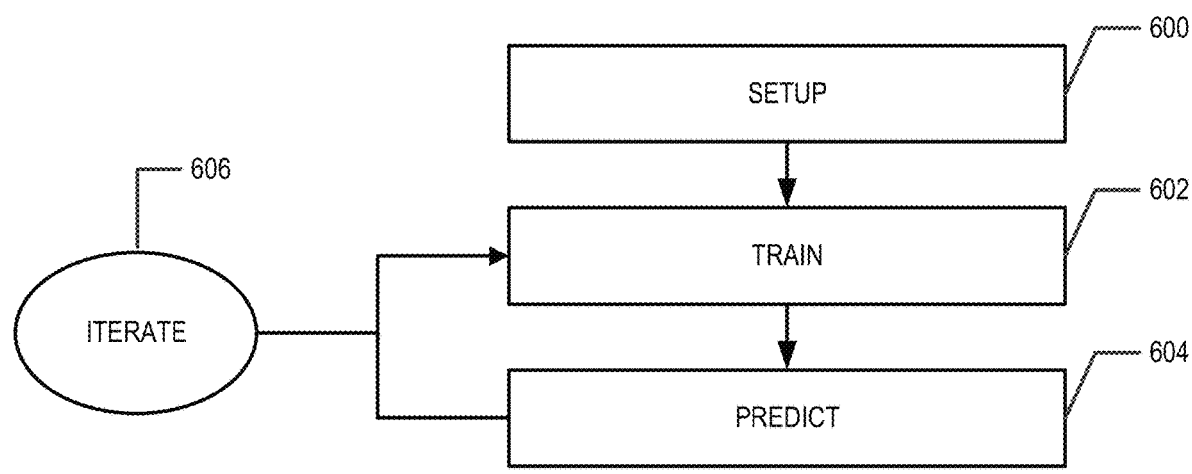

Reference will now be made to FIGS. 4A, 4B, 5, 6, 7A, 7B, 7C, 8, 9, 10, 11, 12, 13, 14, 15, and 16. FIGS. 4A and 4B are examples of taxonomies with root classes. FIG. 5 is an exemplary score distribution for a binary classification model. FIGS. 6, 7A, 7B, 7C, 8, 9, and 10 are flowcharts for exemplary connections, operations, steps, and processes. And FIGS. 11-16 provide an exemplary interactive user interface 1100 of the presentation layer that can be dynamically updated based at least in part on one or more machine learning models in accordance with embodiments of the present invention.

a. Brief Overview

As indicated, there is a latent need for a rigorous methodology that can predict categories for various metadata of data assets or data assets, present the same via an interactive user interface 1100, and assign the categories to the metadata of the data assets or the data assets responsive to user interaction confirming the same. In that regard, embodiments of the present invention provide for machine-assisted data classification as a mechanism designed to support data governance by enabling classification of data assets on any scale. In one embodiment, machine-assisted data classification can be implemented through a presentation layer that allows non-expert users to leverage machine learning models (e.g., binary classification models) without the need to understand the complexities of the underlying technologies or data assets. This human-machine collaboration allows for efficiently classifying data assets stored in one or more data stores or repositories.

1. Technical Problem

In various embodiments, a key challenge faced in data-driven organizations is data governance at scale. Data-driven organizations often have large and diverse data landscapes. For instance, an exemplary environment may contain millions of relational database tables, millions of relational database columns, and millions of Hive columns. These data assets may be stored in a variety of technologies, such as Oracle, DB/2, SQL Server, Teradata, Sybase, Hadoop, Netezza, Kafka, and/or the like. Moreover, these data assets may be inventoried in one or more metadata repositories. Metadata data stores/repositories are inventories of the data assets in an organization's environment.

These data assets can be uniquely classified using data taxonomies. For example, the class that a data asset belongs to may indicate or identify security requirements, retention requirements, the application to which it belongs, its owner, and/or the like. Thus, a data taxonomy is a hierarchy of classes into which data assets can be classified. FIGS. 4A and 4B provide exemplary data taxonomies. The data taxonomy in FIG. 4A is a security taxonomy. The data taxonomy in FIG. 4B is an individual taxonomy. Classification of data assets into such categories/classes (e.g., taxonomies) is essential to effective management and governance of data assets. However, manual classification of data assets is a labor intensive and costly process. The process usually requires a subject matter expert (SME) familiar with the data to inspect each data element (e.g., each Hive table or Hive column in a source) and assign it to a class. Such a process may take a data owner approximately one hour classify 11 data assets of Hive tables. At scale, classifying over a million Hive columns would require over 90,000 hours of effort from a subject matter expert—over 10 years of working 24 hours a day, 7 days a week. In addition to be being time consuming, this would be an extremely costly process. Thus, manual classification of data assets at scale is impracticable.

2. Technical Solution

Embodiments of the present invention provide for new aspects for machine-assisted data classification that leverages machine learning technology to assist data owners in the process of classifying data assets into classes/categories. In this approach, human-machine collaboration is used to efficiently classify metadata of data assets in one or more metadata repositories. To this end, machine learning models (e.g., binary classification models) are stored in association with one or more classification machines 67A-67B. The machine learning models (e.g., binary classification models) are trained using positive datasets and negative datasets corresponding to each classification machine 67A-67B. Next, a classification machine 67A-67B (e.g., executable by a classification computing entity 65) can execute each machine learning model (e.g., binary classification model) on the metadata of each data asset to generate a provisional classification (e.g., a predicted score for the category/class). The provisional classification is presented via a user interface of the presentation layer to a user who accepts or rejects one or more of the provisional classifications for each data asset.

As will be recognized, embodiments of the present invention are designed to be able to execute on top of metadata repositories. The special purpose presentation layer allows the user to train a classification machine 67A-67B (e.g., executable by a classification computing entity 65) on a relatively small set of training datasets and then use the trained classification machine 67A-67B to classify a much larger dataset (e.g., data assets). Embodiments of the present invention are designed to enable large scale data governance where thousands or millions of data assets need to be classified as efficiently as possible.

As additional technical benefits, embodiments of the present invention comprise classification machines 67A-67B that include representations of a bundle of binary classifiers as a single classification machine 67A-67B that allows non-expert user to view the underlying classifiers as a unit. Further, embodiments of the present invention allow for the automatic discovery of binary classifiers by examination of training datasets. Further, the special purpose presentation layer provides the generated predictions that allow non-expert users to easily override one or more provisional classifications. And embodiments of the present invention also support iterative retraining cycles to improve accuracy over time and provide for organizing classification machines 67A-67B into machine groups.

b. Presentation Layer

In one embodiment, the special purpose presentation layer may function as a bridge between the user and one or more machine groups 1105, one or more classification machines 67A-67B, one or more machine learning algorithms (e.g., binary classification algorithms), one or more machine learning models (e.g., binary classification models), and/or the like. The presentation layer may also comprise an interactive user interface 1100.

Machine groups 1105 (see FIGS. 11-16) are used to group classification machines 67A-67B into related groupings as an organizational technique. This capability of the presentation layer allows users to collect related classification machines 67A-67B into machine groups for later re-use and simple identification. The presentation layer is designed to hide the complexities of the technology, making classification of data assets simple and intuitive for non-expert users. The presentation layer is independent of the underlying machine learning technology and can be used with any binary machine learning algorithm (e.g., binary classification algorithm). It can even be used with an external micro-service that provides a customized binary machine learning algorithm (e.g., binary classification algorithm).

c. Binary Classification Models

In one embodiment, each classification machine 67A-67B comprises a plurality of machine learning models (e.g., binary classification models). For example, while multiclass classifications models can be used to predict a specific class to which an item belongs (e.g., multiple genres for a song), binary classification models predict whether an item belongs to a class or not (e.g., whether a data asset is part of a particular class or not). Binary classifiers provide a more granular view into the data assets. Thus, embodiments of the present invention employ binary classifiers. With binary classifiers, the output of each machine learning model (e.g., binary classification model) is a predicted confidence score. The predicted confidence score indicates the machine learning model's (e.g., binary classification model's) predicted certainty that the corresponding data asset belongs to a positive class. In one embodiment, to make the decision about whether a prediction should be classified as positive or negative, a user or administrator may select a classification threshold (cut-off) and compare confidence scores against the threshold, for example. In such an embodiment, confidence score predictions higher than the threshold are then predicted as the positive class, and confidence scores lower than the threshold are predicted as the negative class.

As will be recognized, to achieve these results, a variety of machine learning libraries and algorithms can be used to implement embodiments of the present invention. For example, gradient boosting with H2O, random forest, neural networks, decision trees, and/or various other machine learning techniques can be used to adapt to different needs and circumstances. In one embodiment, the machine learning models (e.g., binary classification models) may be pluggable machine learning models. A pluggable machine learning model can be download and installed to make machine learning easier to use, extensible, and interchangeable.

FIG. 5 shows a confidence score distribution for a binary classification model. In this example, the predictions fall into one of four groups based on the actual known answer and the predicted answer: correct positive predictions (true positives), correct negative predictions (true negatives), incorrect positive predictions (false positives) and incorrect negative predictions (false negatives). Binary classification accuracy metrics quantify the two types of correct predictions and two types of errors. Typical metrics are accuracy (ACC), precision, recall, false positive rate, and F1-measure. Each metric measures a different aspect of the machine learning models (e.g., binary classification models). ACC measures the fraction of correct predictions. Precision measures the fraction of actual positives among those examples that are predicted as positive. Recall measures how many actual positives were predicted as positive. And F1-measure is the harmonic mean of precision and recall. The area under the curve (AUC) measures the ability of the machine learning models (e.g., binary classification models) to predict a higher confidence score for positive examples as compared to negative examples. Because AUC is independent of the selected threshold, it provides a general sense of the prediction performance of the model from the AUC metric without picking a threshold.

As will be recognized, the machine learning models (e.g., binary classification models) will generate predictions in the range [0,1]—although other ranges are within the scope described herein. With the predictions from the machine learning models (e.g., binary classification models), the results can be provided by the interactive user interface 1100 of the presentation layer.

d. Setup

Figure 7A:
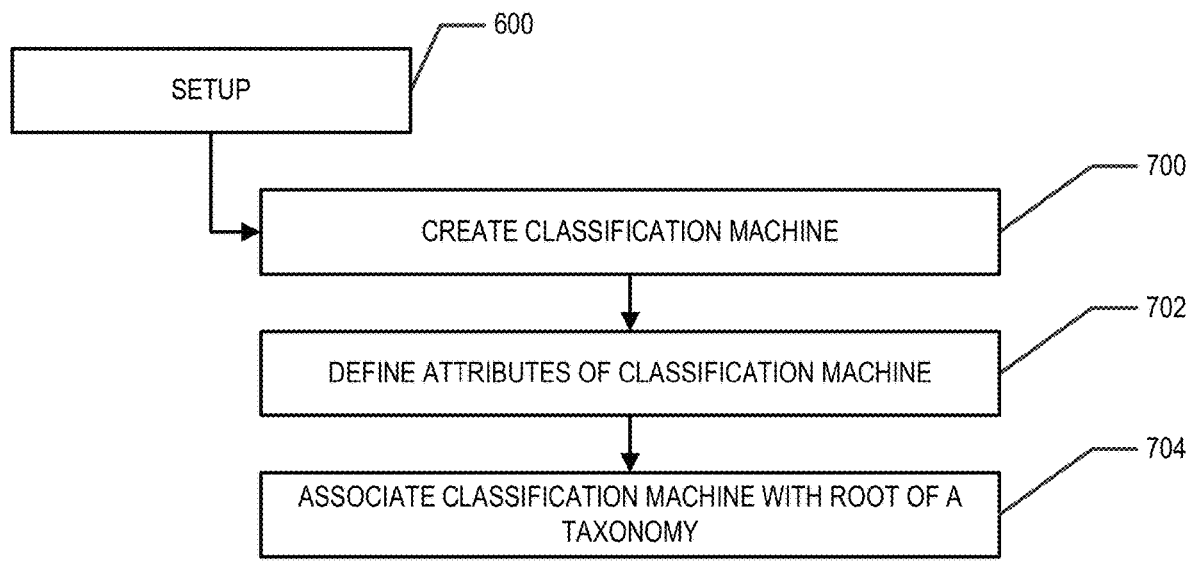
Figure 7B:
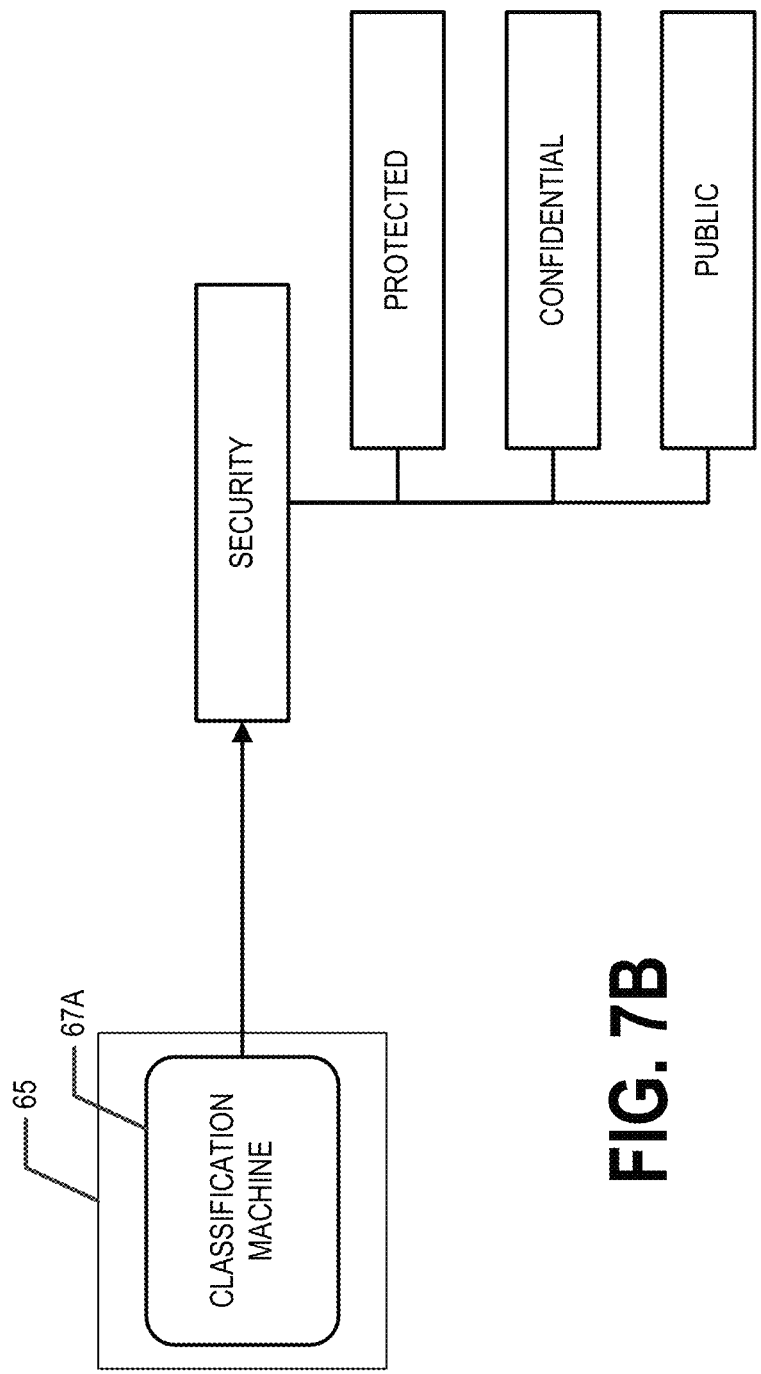
Figure 7C:
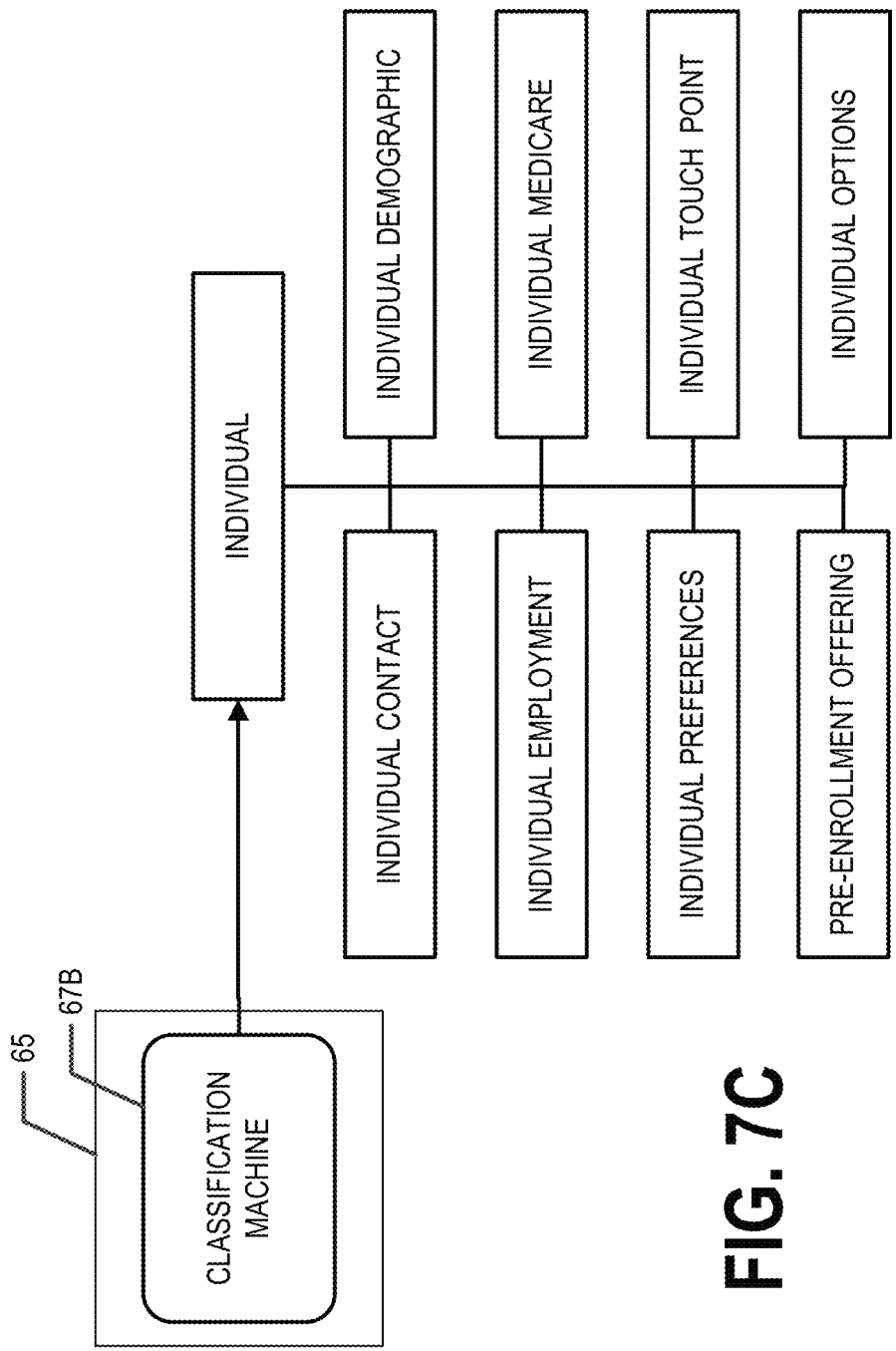

The granular setup connections, operations, steps, and processes are provided in FIGS. 7A, 7B, and 7C. As shown in step/operation 700 of FIG. 7A, a user (e.g., operating a user computing entity 30) can create a classification machine 67A-67B (e.g., executable by a classification computing entity 65). A classification machine 67A-67B is a collection of binary classifiers for a given data taxonomy. To create a classification machine 67A-67B (e.g., executable by a classification computing entity 65), the user (e.g., operating a user computing entity 30) can use any of a number of tools and options to initiate the creation of a classification machine 67A-67B. This may include generating any metadata that is associated with the classification machine 67A-67B, such as the name, description, relevant data assets, associated data taxonomy, data taxonomy attributes or location, and/or the like (step/operation 702 of FIG. 7A and FIG. 11).

As indicated at step/operation 704 of FIG. 7A, the user (e.g., operating a user computing entity 30) connects the classification machine 67A-67B (e.g., executable by a classification computing entity 65) to a data taxonomy. In particular, the user can connect the classification machine 67A-67B (e.g., executable by a classification computing entity 65) to the root class of the data taxonomy. This provides the classification machine 67A-67B with a pointer to the data taxonomy into which data assets will be classified for the corresponding classification machine 67A-67B. FIG. 7B shows a classification machine 67A-67B connected to a security taxonomy. The security taxonomy is associated with a classification machine 67A-67B (e.g., a security classification machine 67A-67B). Eventually, the security classification machine 67A-67B will be associated with at least four machine learning models (e.g., binary classifiers): a security machine learning model, a security protected machine learning model, a security confidential machine learning model, and a security public machine learning model. FIG. 7C shows a classification machine 67A-67B connected to an individual taxonomy. The individual taxonomy is associated with a classification machine 67A-67B (e.g., an individual classification machine 67A-67B). Eventually, the individual classification machine 67A-67B will be associated with at least nine machine learning models (e.g., binary classifiers): an individual machine learning model, an individual contact machine learning model, an individual employment machine learning model, an individual preferences machine learning model, an individual pre-enrollment offering machine learning model, an individual demographic machine learning model, an individual Medicare machine learning model, an individual touch point machine learning model, and an individual options machine learning model.

e. Train

As will be recognized, with a classification machine 67A-67B set up, the classification machine 67A-67B needs to be trained. In other words, the machine learning algorithms (e.g., binary classification algorithms) need to be trained to generate the machine learning models (e.g., binary classification models). As part of the training, the user (e.g., operating a user computing entity 30) selects training data to build a training dataset by associating one or more classes in the data taxonomy with a configurable number of data assets for each class (step/operation 800 of FIG. 8). Initially, the training data may include a list of data assets that can be used to train the different machine learning algorithms (e.g., binary classification algorithms). In one embodiment, the training data is pre-stored training data as possible classifications. The training data comprises both positive and negative datasets. Building the list (e.g., selecting the training data) allows the classification machine 67A-67B to automatically identify each class that will have its own binary classifier.

Figure 12:
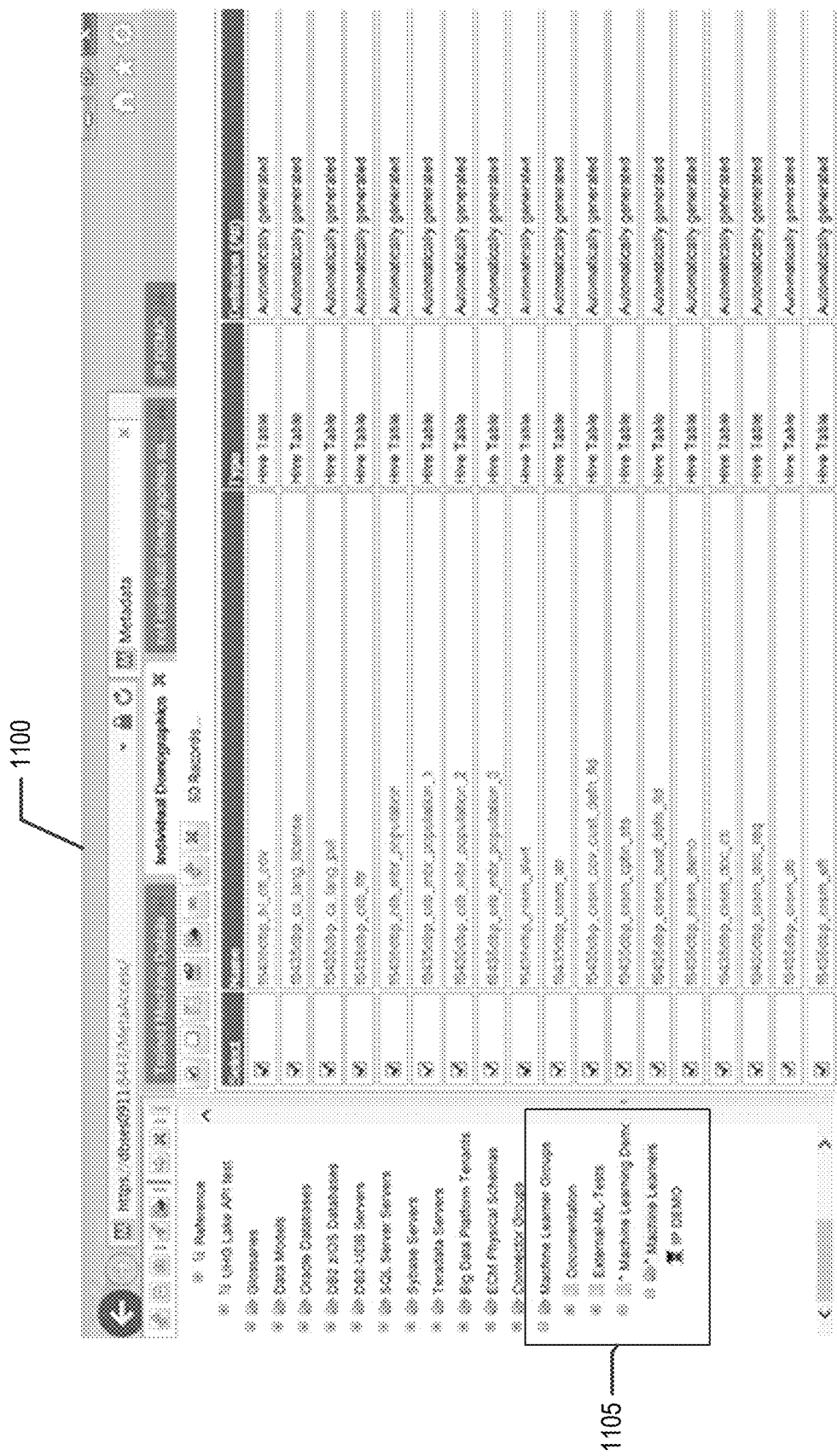
Figure 13:
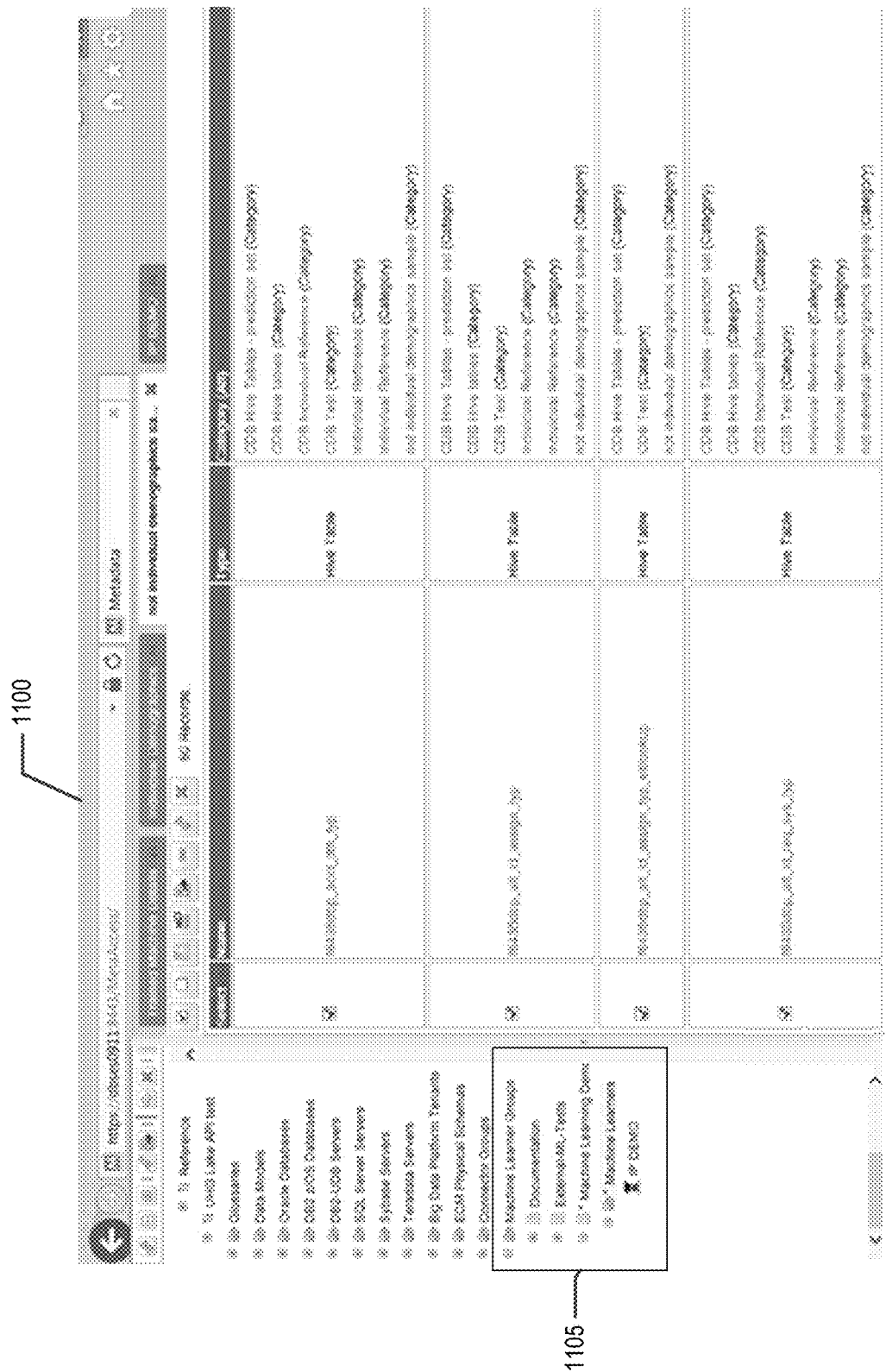

At step/operation 802, for each category/class in the target taxonomy, the user (e.g., operating a user computing entity 30) provides positive examples from the training data by identifying data assets in the list for each specific class in the target taxonomy. For example, FIG. 12 shows a set of data assets selected as positive training examples for the individual demographics class. Similarly, in step/operation 804, for each class in the target taxonomy, the user (e.g., operating a user computing entity 30) provides negative examples by identifying data assets in the list that are not in the specific class of the target taxonomy. For example, FIG. 13 shows a set of data assets selected as negative training examples for the individual demographics class. To select the positive and negative examples, the user (e.g., operating a user computing entity 30) interacts with the interactive user interface 1100 of the presentation layer.

As will be recognized, the positive and negative examples of the training data are used to train the machine learning algorithms (e.g., binary classification algorithms). Thus, each class in a data taxonomy will have positive and negative training examples. For example, there is positive and negative training data for the security binary classifier, positive and negative training data for the security protected binary classifier, positive and negative training data for the security confidential binary classifier, and positive and negative training data for the security public binary classifier. Similarly, there is positive and negative training data for the individual binary classifier, positive and negative training data for the individual contact binary classifier, positive and negative training data for the individual employment binary classifier, positive and negative training data for the individual preferences binary classifier, positive and negative training data for the individual pre-enrollment offering binary classifier, positive and negative training data for the individual demographic binary classifier, positive and negative training data for the individual Medicare binary classifier, positive and negative training data for the individual touch point binary classifier, and positive and negative training data for the individual options binary classifier.

As indicated, in one embodiment, this approach also allows the presentation layer to automatically identify the required binary classifiers for the classification machine 67A-67B. In particular, this allows the presentation layer to create a binary classifier for each class it finds in the training data and to add the identified binary classifiers to the classification machine's 67A-67B bundle of binary classifiers (step/operation 806 of FIG. 8). The selected training data is then used as training datasets (e.g., labeled datasets) in which the classes are the labels and the data assets are the data. With the training datasets, the binary classifiers for the classification machine 67A-67B can be trained using the training datasets.

Then, the user (e.g., operating a user computing entity 30) can train each binary classifier of the classification machine 67A-67B by selecting or inputting the appropriate action or request via the interactive user interface 1100 of the presentation layer (step/operation 808 of FIG. 8). Once initiated, the presentation layer trains the machine learning algorithms (e.g., binary classification algorithms) in the classification machine 67A-67B using the training datasets (e.g., labeled datasets). Training the machine learning algorithms (e.g., binary classification algorithms) generates one or more machine learning models (e.g., binary classification models) that detect patterns in the training dataset mapping the input information/data attributes from the features to the target output or variable. The resulting machine learning models (e.g., binary classification models) are then able to generate predictions for new or unseen information/data (e.g., data assets). For instance, using the machine learning models (e.g., binary classification models), the data classification system 100 (e.g., via a classification computing entity 65) generates predicted confidence scores for metadata of unseen data assets. The hidden and/or weak correlations found as a result of the machine learning are simply not practical for human-implementation. In addition to outputting predicted confidence scores for metadata of unseen data assets, the machine learning models (e.g., binary classification models) can be updated on a continuous, regular, or triggered basis.

Continuing with the above, for a classification machine 67A-67B for the security taxonomy, the resulting classification machine 67A-67B comprises at most four trained machine learning models (e.g., binary classifiers): a security machine learning model, a security protected machine learning model, a security confidential machine learning model, and a security public machine learning model. Similarly, for the individual taxonomy, the resulting classification machine 67A-67B comprises at most nine machine learning models (e.g., binary classifiers): an individual machine learning model, an individual contact machine learning model, an individual employment machine learning model, an individual preferences machine learning model, an individual pre-enrollment offering machine learning model, an individual demographic machine learning model, an individual Medicare machine learning model, an individual touch point machine learning model, and an individual options machine learning model.

Figure 14:
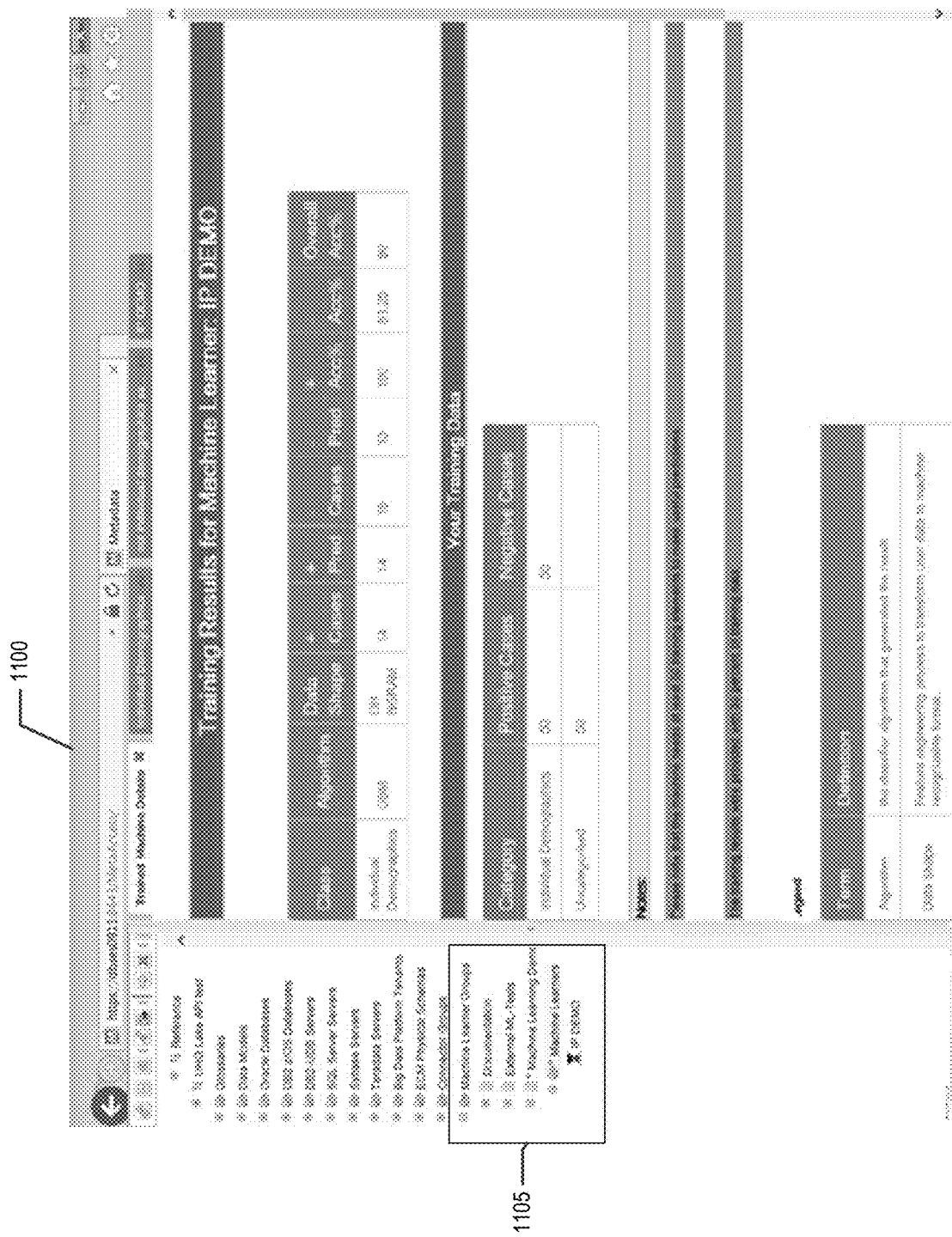

As will be recognized, some of the training datasets or separate datasets (e.g., validation datasets) can be used to evaluate the accuracy of the trained machine learning models (e.g., binary classification models). For example, FIG. 14 shows an interactive user interface 1100 that provides the results of a machine learning model from a classification machine 67A-67B (step/operation 810 of FIG. 8). As is seen in this figure, the category/class from the data taxonomy is individual demographics. Additionally, the interactive user interface 1100 shows the relevant algorithm for the model, the data shape, the number of positive cases trained, the number of positive cases predicted, the number of negative cases trained, the number of negative cases predicted, the ACC percentages, the categorization statistics, and the definitions. This allows the user (e.g., operating a user computing entity 30) to understand the accuracy and other details of each machine learning model of the classification machine 67A-67B.

f. Predict and Assign

Once trained, the classification machine 67A-67B is ready to predict categories/classes (e.g., generate scores) in taxonomies for unclassified data assets (e.g., unseen data assets). The predictions can be initiated using a manual approach (FIG. 9A) or an automated approach (FIG. 9B).

1. Manual Approach

Figure 9A:
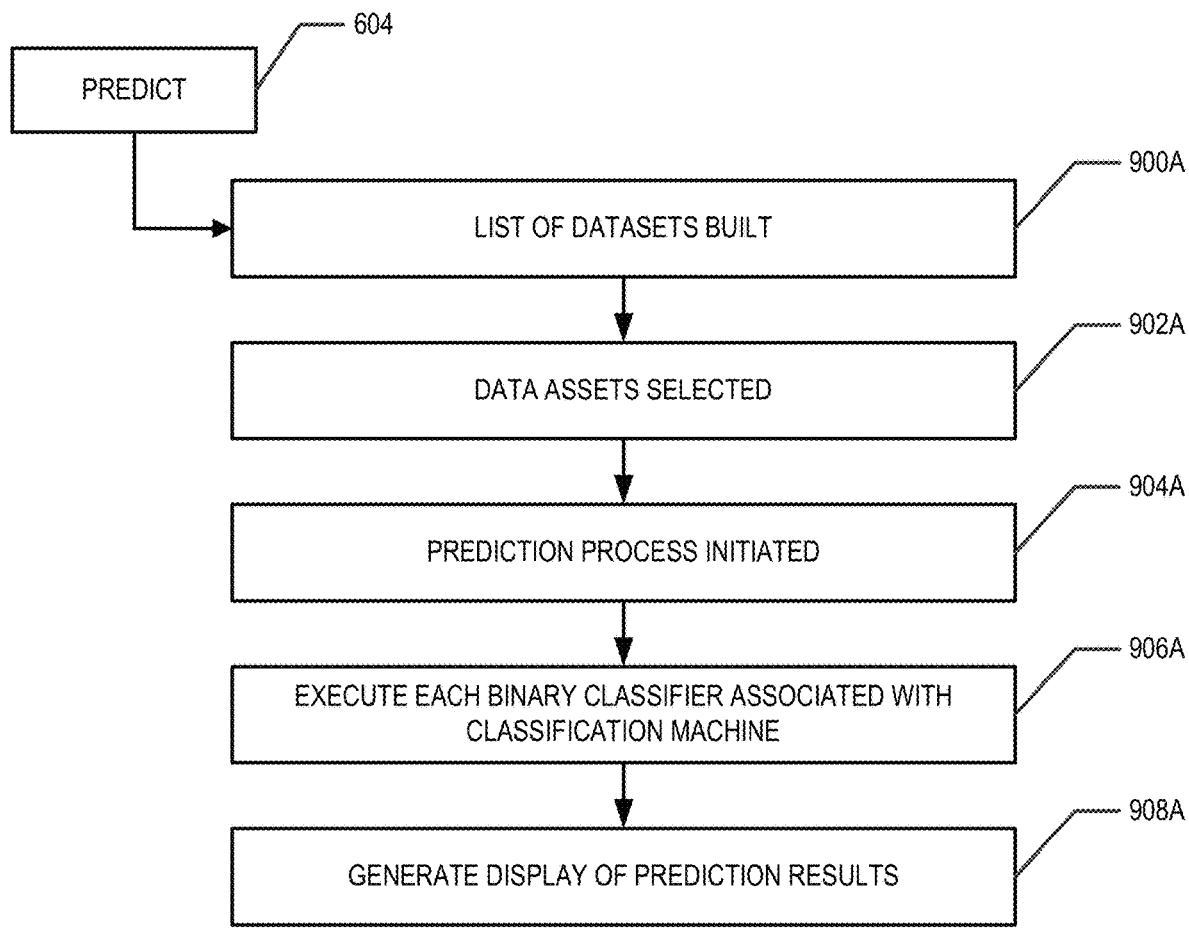
Figure 9B:
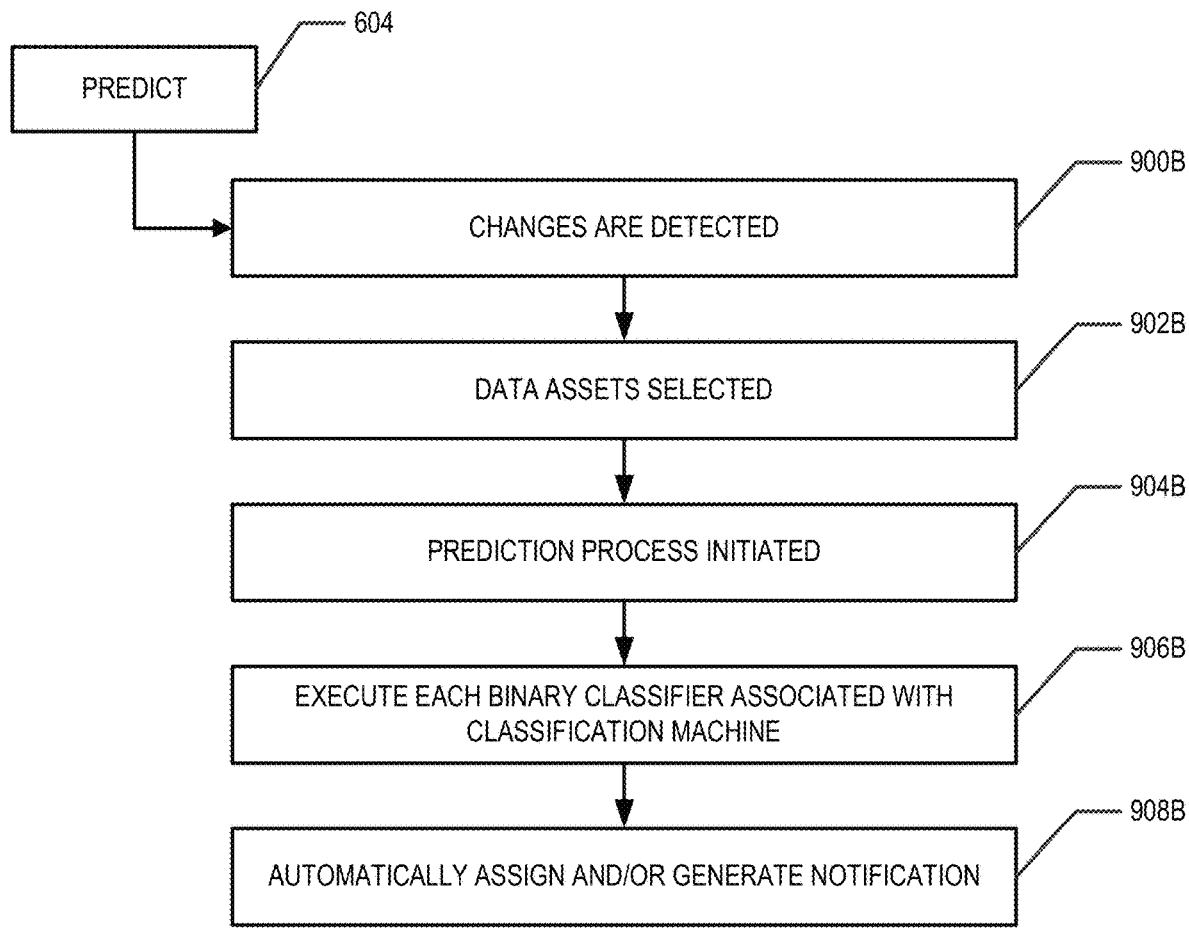
Figure 15:
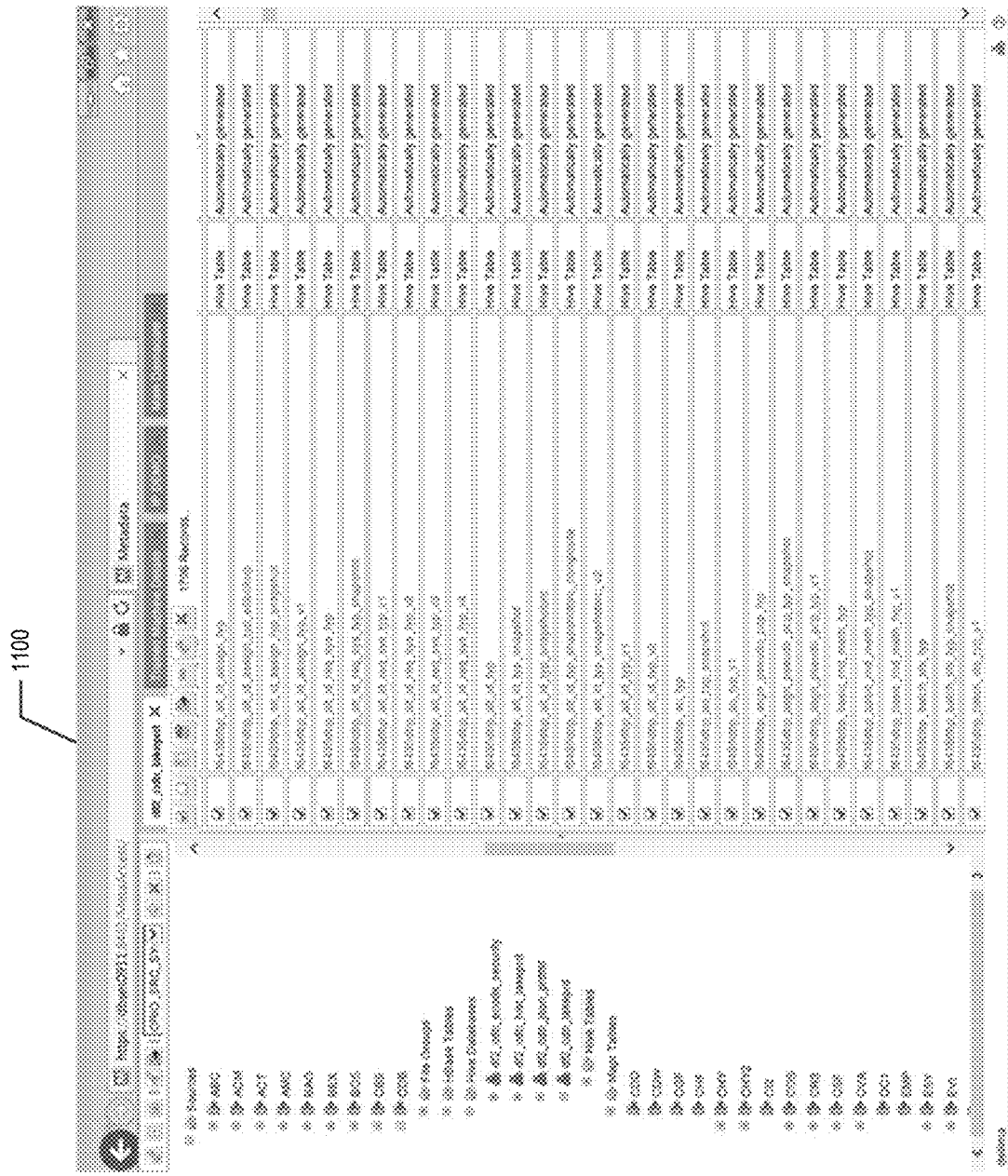

In the manual approach, the user (e.g., operating a user computing entity 30) selects unseen data assets to build an unseen dataset (step/operation 900A of FIG. 9A). In some embodiments, unseen data assets are datasets that have not been assigned to a data taxonomy or a class in a data taxonomy. In other embodiments, the unseen data assets may already be assigned to a data taxonomy or a class in a data taxonomy. With the unseen datasets (e.g., a list of data assets), the user (e.g., operating a user computing entity 30) can select data assets to be classified (step/operation 902A of FIG. 9A). For example, FIG. 15 shows the interactive user interface 1100 of the presentation layer being used to select various data assets for classification.

At step/operation 904A of FIG. 9A, the user (e.g., operating a user computing entity 30) can interact with the interactive user interface 1100 of the presentation layer to launch the prediction process for corresponding classification machine 67A-67B. In the prediction process, the presentation layer executes each binary classification model from the corresponding classification machine 67A-67B (step/operation 906A of FIG. 9A). For example, for a classification machine 67A-67B for the security taxonomy, the presentation layer executes at most four trained machine learning models (e.g., binary classifiers) and generates respective confidence scores for each data asset: the security machine learning model generates/predicts a confidence score for each data asset in the unseen dataset, the security protected machine learning model generates/predicts a confidence score for each data asset in the unseen dataset, the security confidential machine learning model generates/predicts a confidence score for each data asset in the unseen dataset, and the security public machine learning model generates/predicts a confidence score for each data asset in the unseen dataset. Similarly, for the individual taxonomy, the corresponding classification machine 67A-67B executes at most nine machine learning models (e.g., binary classifiers): the individual machine learning model generates/predicts a confidence score for each data asset in the unseen dataset, the individual contact machine learning model generates/predicts a confidence score for each data asset in the unseen dataset, the individual employment machine learning model generates/predicts a confidence score for each data asset in the unseen dataset, the individual preferences machine learning model generates/predicts a confidence score for each data asset in the unseen dataset, the individual pre-enrollment offering machine learning model generates/predicts a confidence score for each data asset in the unseen dataset, the individual demographic machine learning model generates/predicts a confidence score for each data asset in the unseen dataset, the individual Medicare machine learning model generates/predicts a confidence score for each data asset in the unseen dataset, the individual touch point machine learning model generates/predicts a confidence score for each data asset in the unseen dataset, and the individual options machine learning model generates/predicts a confidence score for each data asset in the unseen dataset.

Thus, for each data asset in the unseen dataset, the number of predicted confidence scores will correspond to the number of machine learning models in the classification machine 67A-67B. Thus, for the security classification machine 67A-67B, each data asset in the unseen dataset will have at most four predicted confidence scores. Similarly, for the individual classification machine 67A-67B, each data asset in the unseen dataset will have at most nine predicted confidence scores.

Figure 16:
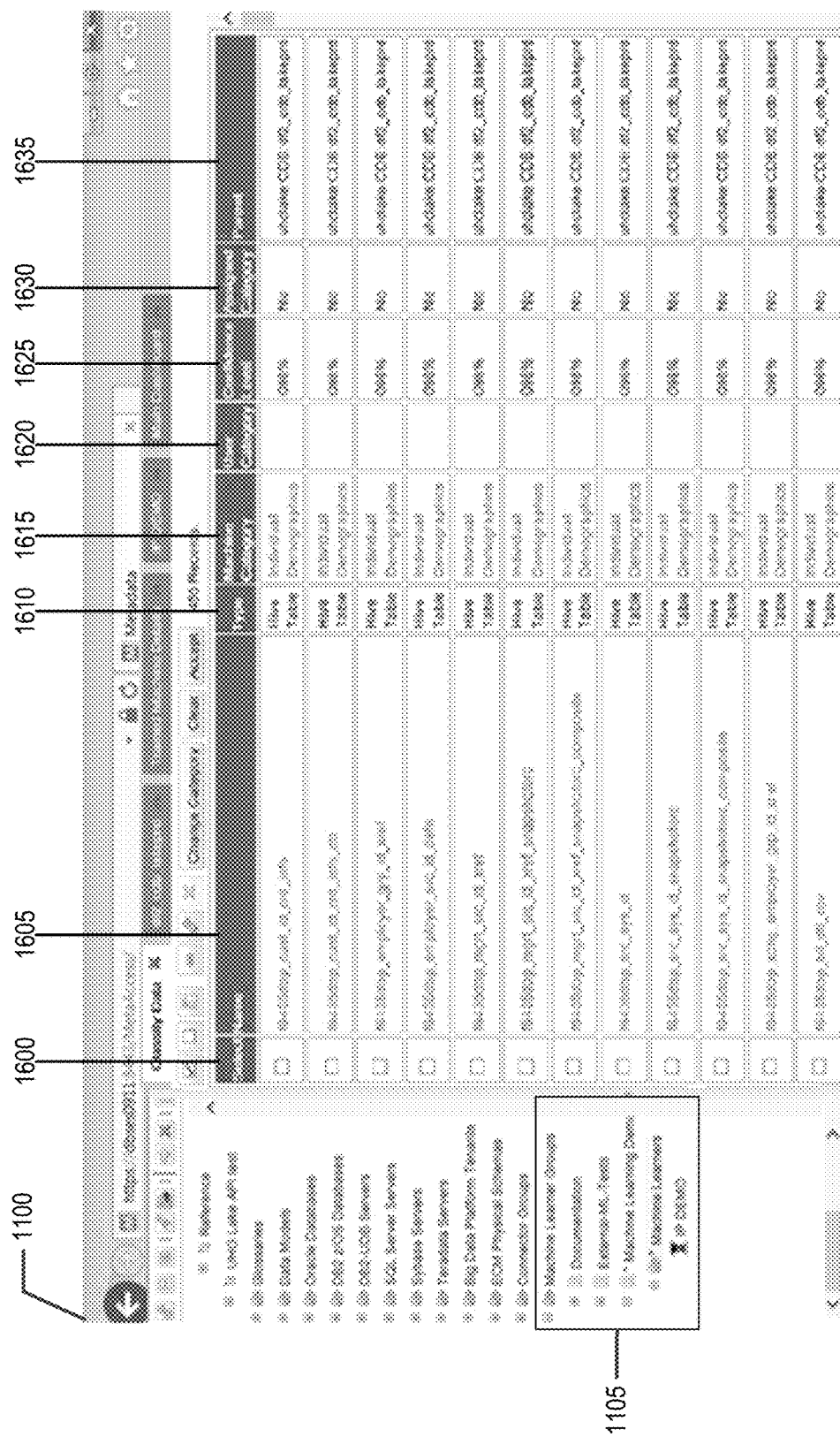

In one embodiment, the metadata for the data assets in the unseen datasets along with their confidence scores can be presented via the interactive user interface 1100 of the presentation layer (step/operation 908A of FIG. 9A). For example, FIG. 16 shows metadata for the data assets that includes a data asset name 1605, a data asset type 1610, a machine category/class 1615 (e.g., a class of a data taxonomy for the row), a user category/class 1620 (e.g., a user provided class of a data taxonomy for the row), a confidence score 1625 (e.g., level), an assigned category/class 1630, and the parent data asset in the repository 1635 to which the data asset belongs.

In one embodiment, the default layout of the interactive user interface 1100 presentation sorts the data assets by confidence score in descending order. This presents the data assets with the highest confidence predictions to the user for review first. The confidence score indicates as a percentage the confidence the classification machine 67A-67B has that the data asset belongs to a given category/class in a data taxonomy.

As will be recognized, the portions of the interactive user interface 1100 are sortable and filterable (e.g., elements 1600, 1605, 1610, 1615, 1620, 1625, 1630, and 1635). For example, if the data assets were sorted by name, the interface would present each data asset with the same number of rows as there are machine learning models in the classification machine 67A-67B. For example, for the security classification machine 67A-67B, each data asset would be listed in at most four separate rows with a corresponding confidence score for each machine learning model corresponding to the respective classes in the data taxonomy. Similarly, for the individual classification machine 67A-67B, each data asset would be listed in at most nine separate rows with a corresponding confidence score for each machine learning model corresponding to the respective classes in the data taxonomy. In another embodiment, only confidence scores above a configurable threshold (e.g., 50%) are presented via the interactive user interface 1100 of the presentation layer.

The interactive user interface 1100 also provides a selection option 1600 that allows the user to select one or more data assets to accept the recommend machine category/class, clear the recommended category/class, and change (e.g., override) the recommended category/class. If the recommended machine category/class 1615 is accepted, the metadata for the data asset or the data asset would be assigned the respective category/class. The interactive user interface 1100 would also indicate the category/class as having been assigned and assign the category/class to the data asset in the metadata repository 1635. In one embodiment, the interactive user interface 1100 may also provide an option to accept, change (e.g., override), or clear a particular category/class. Similarly, this functionality allows the user to clear the recommended category/class or change (e.g., override) the recommended category/class to a user-provided category/ class. As will be recognized, a variety of other approaches and techniques can be used to adapt to various needs and circumstances.

2. Automated Approach

In the automated approach, the ingestion of new data or metadata can be detected by "file watchers" or "watchers" that are configured to monitor target areas (e.g., landing zones). In one embodiment, classification machines 67A-67B can be configured to use file watchers or watchers to monitor changes to data, metadata, files, data metadata repository 1635, and/or the like in the landing zones. In this regard, the file watchers or watchers can initiate the automatic execution of classification machines 67A-67B on data assets based on one or more detected changes.

When a change is detected (step/operation 900B of FIG. 9B), the corresponding classification machine 67A-67B can automatically select data assets to be classified (step/operation 902B of FIG. 9B). At step/operation 904B of FIG. 9B, the corresponding classification machine 67A-67B can automatically launch the prediction process. As described above, in the prediction process, the corresponding classification machine 67A-67B executes each binary classification model (step/operation 906B of FIG. 9B). For example, for a classification machine 67A-67B for the security taxonomy, the corresponding classification machine 67A-67B executes at most four trained machine learning models (e.g., binary classifiers) and generates respective confidence scores for each data asset: the security machine learning model generates/predicts a confidence score for each data asset in the unseen dataset, the security protected machine learning model generates/predicts a confidence score for each data asset in the unseen dataset, the security confidential machine learning model generates/predicts a confidence score for each data asset in the unseen dataset, and the security public machine learning model generates/predicts a confidence score for each data asset in the unseen dataset. Similarly, for the individual taxonomy, the corresponding classification machine 67A-67B executes at most nine machine learning models (e.g., binary classifiers): the individual machine learning model generates/predicts a confidence score for each data asset in the unseen dataset, the individual contact machine learning model generates/predicts a confidence score for each data asset in the unseen dataset, the individual employment machine learning model generates/predicts a confidence score for each data asset in the unseen dataset, the individual preferences machine learning model generates/predicts a confidence score for each data asset in the unseen dataset, the individual pre-enrollment offering machine learning model generates/predicts a confidence score for each data asset in the unseen dataset, the individual demographic machine learning model generates/predicts a confidence score for each data asset in the unseen dataset, the individual Medicare machine learning model generates/predicts a confidence score for each data asset in the unseen dataset, the individual touch point machine learning model generates/predicts a confidence score for each data asset in the unseen dataset, and the individual options machine learning model generates/predicts a confidence score for each data asset in the unseen dataset.

Thus, for each data asset in the unseen dataset, the number of predicted confidence scores will correspond to the number of machine learning models in the classification machine 67A-67B. Thus, for the security classification machine 67A-67B, each data asset in the unseen dataset will have at most four predicted confidence scores. Similarly, for the individual classification machine 67A-67B, each data asset in the unseen dataset will have at most nine predicted confidence scores.

In one embodiment, as indicated in 908B of FIG. 9B, the classification machine 67A-67B can automatically assign categories/classes and/or provide notification to one or more users regarding the same. For instance, classification machines 67A-67B can be used to define a configurable threshold (e.g., 74%) that allows for the automatic assignment of a predicted category/class if the category/class satisfies a configurable threshold. For example, if the security confidential binary classifier generates/predicts a confidence score for an unseen data asset as 0.74, the corresponding classification machine 67A-67B can automatically assign the category/class to the corresponding data asset if the configurable threshold or ≤0.74. In this example, the notification may be a digest email summarizing the results of the classification process. As will be recognized, such an approach allows for the automated categorization/classification of data assets with minimal user interaction. Similarly, as described with regard to 908A of FIG. 9A, the classification machines 67A-67B can be used to provide a notification to one or more users that the predictions need to be reviewed and/or present the predictions using the presentation layer as described previously. In this approach users can be notified that classification machines 67A-67B have been executed and a review is needed. As will be recognized, a variety of other approaches and techniques can be used to adapt to various needs and circumstances.

f. Iterate

Figure 10:
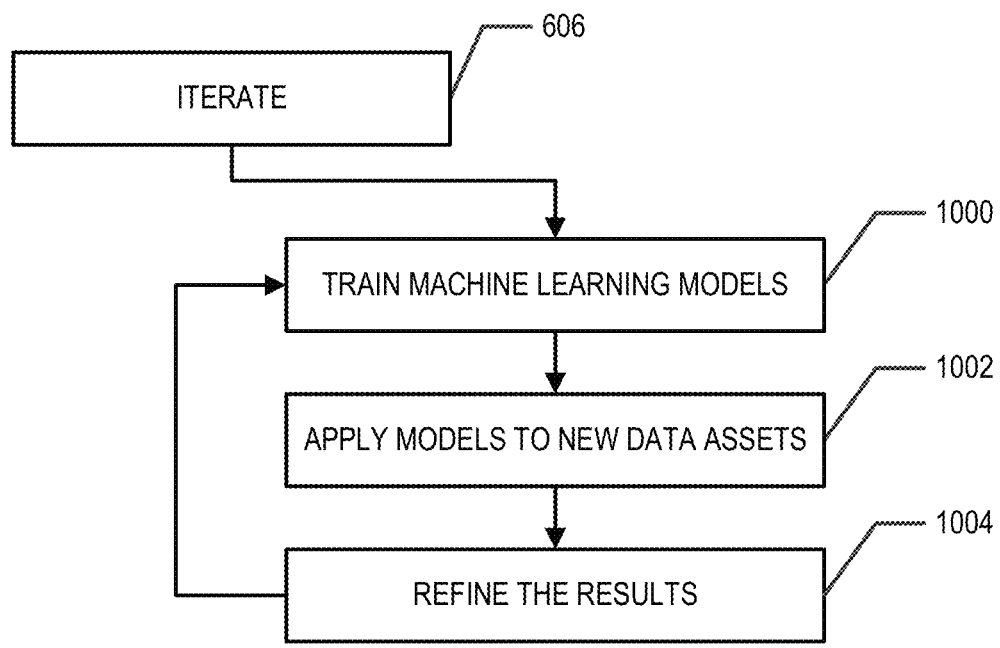
Figure 11:
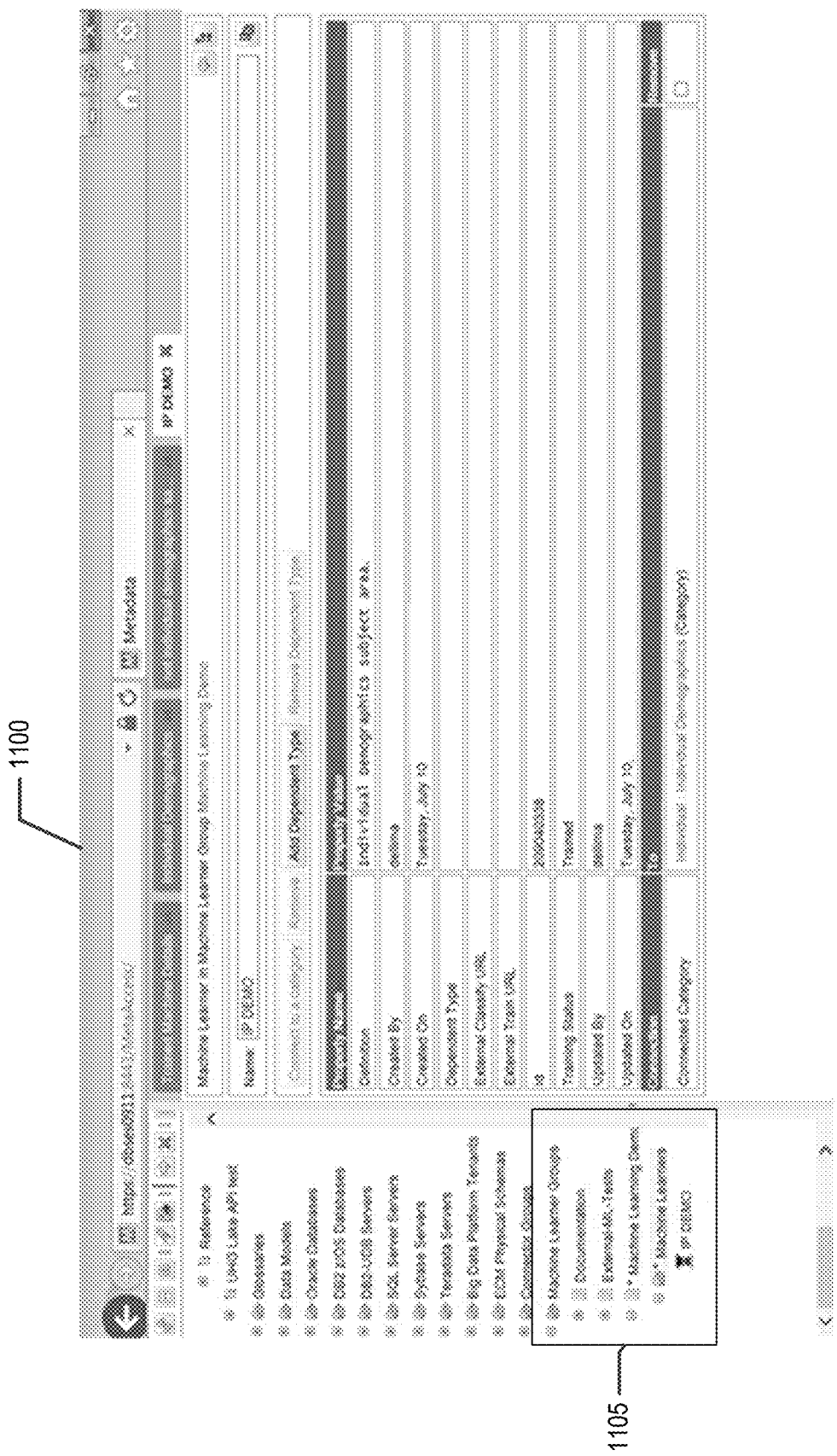

In one embodiment, as part of the iteration process (step/operation 606), the data classification system 100 (e.g., classification computing entity 65) continuously retrains the models to adapt to changes in features, data assets, and/or the like (steps/operations 1000, 1002, 1004 of FIG. 10). Changes in features and data assets may be due to time-dependent factors and/or time-independent factors. Thus, the data classification system 100 (e.g., classification computing entity 65) continuously retrains the machine learning models and applies the retrained models to new data assets. This process continuously refines the results (e.g., scores) to maintain the accuracy of the models.

As will be recognized, the retraining may be initiated in a variety of ways. In one embodiment, the data classification system 100 can retrain the one or more machine learning models on a fixed schedule (e.g., hourly, daily, weekly, and/or the like). In another embodiment, the data classification system 100 can retrain the one or more machine learning models based at least in part on one or more automated triggers. For example, the data classification system 100 may execute change detection algorithms to detect changes in features and/or data assets. As will be recognized a variety of approaches and techniques can be used to adapt to various needs and circumstances.

IV. Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:

storing, by one or more processors, a first classification machine, wherein (a) the first classification machine is associated with a first data taxonomy comprising a first plurality of data asset classes, (b) the first classification machine comprises a machine learning model for each of the first plurality of data asset classes, (c) each machine learning model for each of the first plurality of data asset classes is configured to generate predicted confidence scores for unseen data assets for the corresponding data asset class, and (d) each predicted confidence score indicates a predicted confidence that the corresponding unseen data asset belongs to the corresponding machine learning model's data asset class;

storing, by the one or more processors, a second classification machine, wherein (a) the second classification machine is associated with a second data taxonomy comprising a second plurality of data asset classes, (b) the second classification machine comprises a machine learning model for each of the second plurality of data asset classes, and (c) each machine learning model for each of the second plurality of data asset classes is configured to generate predicted confidence scores for unseen data assets for the corresponding data asset class of the second plurality of data asset classes;

accessing, by the one or more processors, a first plurality of unseen data assets and a second plurality of unseen data assets;

generating, by the one or more processors and using each machine learning model for each of the first plurality of data asset classes, a predicted confidence score for each unseen data asset of the first plurality of unseen data assets, wherein the corresponding predicted confidence score indicates a predicted confidence that the corresponding unseen data asset belongs to the corresponding machine learning model's data asset class;

generating, by the one or more processors and using each machine learning model for each of the second plurality of data asset classes, a predicted confidence score for each unseen data asset of the second plurality of unseen data assets, wherein the corresponding predicted confidence score indicates a predicted confidence that the corresponding unseen data asset belongs to the corresponding machine learning model's data asset class; and providing, by the one or more processors and via a presentation layer, an interface for display, wherein (a) the interface displays a textual indication of each of the first plurality of unseen data assets, (b) the interface displays a highest corresponding predicted confidence score for each unseen data asset of the first plurality of unseen data assets, (c) the highest corresponding predicted confidence score is selected from the predicted confidence scores from each machine learning model for each of the first plurality of data asset classes, and (d) the interface comprises a user-selectable element to accept or override the highest corresponding predicted confidence score for each unseen data asset of the first plurality of unseen data assets.

2. The computer-implemented method of claim 1, wherein each machine learning model for the first classification machine is automatically added to the first classification machine based at least in part on a first training dataset.

3. The computer-implemented method of claim 1, wherein the at least a portion of the first plurality of unseen data assets are sortable via the interface by predicted confidence score, data asset name, or class of the first data taxonomy.

4. The computer-implemented method of claim 1, wherein accepting the highest corresponding predicted confidence score for an unseen data asset assigns a first data asset class to the corresponding unseen data asset.

5. The computer-implemented method of claim 1 further comprising dynamically updating the interface to reflect an acceptance.

6. The computer-implemented method of claim 1, wherein generating the predicted confidence score for each unseen data asset of the first plurality of unseen data assets is automatic in response to a detected change in the first plurality of unseen data assets.

7. A computer program product comprising a non-transitory computer readable medium having computer program instructions stored therein, the computer program instructions when executed by a processor, cause the processor to:

store a first classification machine, wherein (a) the first classification machine is associated with a first data taxonomy comprising a first plurality of data asset classes, (b) the first classification machine comprises a machine learning model for each of the first plurality of data asset classes, (c) each machine learning model for each of the first plurality of data asset classes is configured to generate predicted confidence scores for unseen data assets for the corresponding data asset class, and (d) each predicted confidence score indicates a predicted confidence that the corresponding unseen data asset belongs to the corresponding machine learning model's data asset class;

store a second classification machine, wherein (a) the second classification machine is associated with a second data taxonomy comprising a second plurality of data asset classes, (b) the second classification machine comprises a machine learning model for each of the second plurality of data asset classes, and (c) each machine learning model for each of the second plurality of data asset classes is configured to generate predicted confidence scores for unseen data assets for the corresponding data asset class of the second plurality of data asset classes;

access a first plurality of unseen data assets and a second plurality of unseen data assets;

execute generate, using each machine learning model for each of the first plurality of data asset classes, a predicted confidence score for each unseen data asset of the first plurality of unseen data assets, wherein the corresponding predicted confidence score indicates a predicted confidence that the corresponding unseen data asset belongs to the corresponding machine learning model's data asset class;

generate, using each machine learning model for each of the second plurality of data asset classes, a predicted confidence score for each unseen data asset of the second plurality of unseen data assets, wherein the corresponding predicted confidence score indicates a predicted confidence that the corresponding unseen data asset belongs to the corresponding machine learning model's data asset class; and provide, via a presentation layer, an interface for display, wherein (a) the interface displays a textual indication of each of the first plurality of unseen data assets, (b) the interface displays a highest corresponding predicted confidence score for each unseen data asset of the first plurality of unseen data assets, (c) the highest corresponding predicted confidence score is selected from the predicted confidence scores from each machine learning model for each of the first plurality of data asset classes, and (d) the interface comprises a user-selectable element to accept or override the highest corresponding predicted confidence score for each unseen data asset of the first plurality of unseen data assets.

8. The computer program product of claim 7, wherein each machine learning model for the first classification machine is automatically added to the first classification machine based at least in part on a first training dataset.

9. The computer program product of claim 7, wherein the at least a portion of the first plurality of unseen data assets are sortable via the interface by predicted confidence score, data asset name, or class of the first data taxonomy.

10. The computer program product of claim 7, wherein accepting the highest corresponding predicted confidence score for an unseen data asset assigns a first data asset class to the corresponding unseen data asset.

11. The computer program product of claim 7, wherein the computer program instructions when executed by a processor, further cause the processor to:
dynamically update the interface to reflect an acceptance.

12. The computer program product of claim 7, wherein generating the predicted confidence score for each unseen data asset of the first plurality of unseen data assets is automatic in response to a detected change in the first plurality of unseen data assets.

13. A computing system comprising a non-transitory computer readable storage medium and one or more processors, the computing system configured to:
store a first classification machine, wherein (a) the first classification machine is associated with a first data taxonomy comprising a first plurality of data asset classes, (b) the first classification machine comprises a machine learning model for each of the first plurality of data asset classes, (c) each machine learning model for each of the first plurality of data asset classes is configured to generate predicted confidence scores for unseen data assets for the corresponding data asset class, and (d) each predicted confidence score indicates a predicted confidence that the corresponding unseen data asset belongs to the corresponding machine learning model's data asset class;
store a second classification machine, wherein (a) the second classification machine is associated with a second data taxonomy comprising a second plurality of data asset classes, (b) the second classification machine comprises a machine learning model for each of the second plurality of data asset classes, and (c) each machine learning model for each of the second plurality of data asset classes is configured to generate predicted confidence scores for unseen data assets for the corresponding data asset class of the second plurality of data asset classes;
access a first plurality of unseen data assets and a second plurality of unseen data assets;
execute generate, using each machine learning model for each of the first plurality of data asset classes, a predicted confidence score for each unseen data asset of the first plurality of unseen data assets, wherein the corresponding predicted confidence score indicates a predicted confidence that the corresponding unseen data asset belongs to the corresponding machine learning model's data asset class;
generate, using each machine learning model for each of the second plurality of data asset classes, a predicted confidence score for each unseen data asset of the second plurality of unseen data assets, wherein the corresponding predicted confidence score indicates a predicted confidence that the corresponding unseen data asset belongs to the corresponding machine learning model's data asset class; and
provide, via a presentation layer, an interface for display, wherein (a) the interface displays a textual indication of each of the first plurality of unseen data assets, (b) the interface displays a highest corresponding predicted confidence score for each unseen data asset of the first plurality of unseen data assets, (c) the highest corresponding predicted confidence score is selected from the predicted confidence scores from each machine learning model for each of the first plurality of data asset classes, and (d) the interface comprises a user-selectable element to accept or override the highest corresponding predicted confidence score for each unseen data asset of the first plurality of unseen data assets;
via a presentation layer, an interface for display, wherein (a) the interface displays a textual indication of each of the first plurality of unseen data assets, (b) the interface displays a highest corresponding predicted confidence score for each unseen data asset of the first plurality of unseen data assets, (c) the highest corresponding predicted confidence score is selected from the predicted confidence scores from each machine learning model for each of the first plurality of data asset classes, and (d) the interface comprises a user-selectable element to accept or override the highest corresponding predicted confidence score for each unseen data asset of the first plurality of unseen data assets.

14. The computing system of claim 13, wherein each machine learning model for the first classification machine is automatically added to the first classification machine based at least in part on a first training dataset.

15. The computing system of claim 13, wherein the at least a portion of the first plurality of unseen data assets are sortable via the interface by predicted confidence score, data asset name, or class of the first data taxonomy.

16. The computing system of claim 13, wherein accepting the highest corresponding predicted confidence score for an unseen data asset assigns a first data asset class to the corresponding unseen data asset.

17. The computing system of claim 13, wherein the computing system is further configured to:
update he interface to reflect an acceptance.

18. The computing system of claim 13, wherein generating the predicted confidence score for each unseen data asset of the first plurality of unseen data assets is automatic in response to a detected change in the first plurality of unseen data assets.

* * * * *